United States Patent
Nakata et al.

[11] Patent Number: 5,870,756
[45] Date of Patent: Feb. 9, 1999

[54] INTERCHANGEABLE STORAGE MEDIUM CONTAINING PROGRAM FOR PROCESSING DATA FILES THEREUPON TO MATCH A DATA FILE FORMAT TO A COMPUTER SYSTEM

[75] Inventors: Masahiro Nakata; Kouichi Ogawa, both of Kawasaki, Japan

[73] Assignee: Fujitsu Limited, Kawasaki, Japan

[21] Appl. No.: 747,924

[22] Filed: Nov. 12, 1996

[30] Foreign Application Priority Data

Apr. 26, 1996 [JP] Japan ............................ HEI. 8-107248

[51] Int. Cl.⁶ .................................................. G06F 13/00
[52] U.S. Cl. .................................. 707/200; 707/1; 707/2; 707/4; 711/111; 711/115; 711/154; 711/170
[58] Field of Search .................................... 707/1, 2, 200, 707/4; 711/111, 155, 115, 154, 170

[56] References Cited

U.S. PATENT DOCUMENTS

| | | | |
|---|---|---|---|
| 4,675,814 | 6/1987 | Murai et al. | 395/712 |
| 5,062,042 | 10/1991 | Binkley et al. | 707/205 |
| 5,101,494 | 3/1992 | Bilski et al. | 395/704 |
| 5,289,581 | 2/1994 | Berenguel et al. | 711/113 |
| 5,355,497 | 10/1994 | Cohen-Levy | 707/200 |
| 5,367,671 | 11/1994 | Feigenbaum et al. | 707/1 |
| 5,404,520 | 4/1995 | Masuyaki | 395/671 |
| 5,613,125 | 3/1997 | Nguyen et al. | 395/651 |
| 5,657,473 | 8/1997 | Killean et al. | 711/163 |

FOREIGN PATENT DOCUMENTS

| | | |
|---|---|---|
| 2-96227 | 4/1990 | Japan . |
| 2-179743 | 7/1990 | Japan . |
| 2-213958 | 8/1990 | Japan . |
| 2-267794 | 11/1990 | Japan . |
| 4-157672 | 5/1992 | Japan . |
| 5-289854 | 11/1993 | Japan . |
| 5-324204 | 12/1993 | Japan . |
| 6-314175 | 11/1994 | Japan . |
| 7-6114 | 1/1995 | Japan . |
| 7-64841 | 3/1995 | Japan . |
| 7-65540 | 3/1995 | Japan . |
| 7-182218 | 7/1995 | Japan . |

*Primary Examiner*—Thomas G. Black
*Assistant Examiner*—Jean R. Homere
*Attorney, Agent, or Firm*—Nikaido, Marmelstein, Murray & Oram LLP

[57] ABSTRACT

The following items are recorded on an interchangeable storage medium used for input/output in a computer system: (1) a data file specified by a file name, (2) a program for subjecting the data file to processing that makes it possible for the data file to be utilized by a computer system, (3) data control information indicating, for each data file, a corresponding relationship among a file name of the data file, the name of a program for applying the processing to the data file specified by the file name and the location of the data file, and (4) program control information indicating the corresponding relationship between a program name and a program location. When a data file is to be read from an interchangeable storage medium, the data file is subjected to predetermined processing by a program which corresponds to the data file so as to be converted to data capable of being utilized by a computer system. When a data file is written, the data file is subjected to predetermined processing by a program which corresponds to the data file and then written to an interchangeable storage medium.

21 Claims, 31 Drawing Sheets

FIG.11A RECORDED DATA (FILE Data A) ON INFORMATION RECORDING MEDIUM

| a | b | c | d | e | f |
|---|---|---|---|---|---|

FIG.11B DATA READ IN BY OS/A

| 8281 | 8282 | 8283 | 8284 | 8285 | 8286 |
|------|------|------|------|------|------|

FIG.11C DATA READ IN BY OS/B

| 2361 | 2362 | 2363 | 2364 | 2365 | 2366 |
|------|------|------|------|------|------|

FIG. 12A

| A1 | A2 | A3 | A4 | A5 | A6 | A7 | A8 |
|----|----|----|----|----|----|----|----|
| B1 | B2 | B3 | B4 | B5 | B6 | B7 | B8 |
| C1 | C2 | C3 | C4 | C5 | C6 | C7 | C8 |
| D1 | D2 | D3 | D4 | D5 | D6 | D7 | D8 |
| E1 | E2 | E3 | E4 | E5 | E6 | E7 | E8 |
| F1 | F2 | F3 | F4 | F5 | F6 | F7 | F8 |
| G1 | G2 | G3 | G4 | G5 | G6 | G7 | G8 |
| H1 | H2 | H3 | H4 | H5 | H6 | H7 | H8 |

FIG. 12B

BEGINNING OF DATA → | A1 | A2 | A3 | A4 | A5 | A6 | A7 | A8 | B1 | ~ | G8 | H1 | H2 | H3 | H4 | H5 | H6 | H7 | H8 | ← END OF DATA

IMAGE DATA IN OS/B

FIG. 12C

BEGINNING OF DATA → | IMAGE INFORMATION | QUANTIZATION TABLE | HUFFMAN TABLE | A'1 | A'2 | B'1 | C'1 | ~ | G'8 | H'7 | H'8 | ← END OF DATA

IMAGE DATA ON MEDIUM

FIG. 12D

BEGINNING OF DATA → | IMAGE INFORMATION | H1 | H2 | H3 | H4 | H5 | H6 | H7 | H8 | G1 | ~ | A3 | A4 | A5 | A6 | A7 | A8 | ← END OF DATA

IMAGE DATA IN OS/A

FIG. 23

| Name | Start Sector | Data Driver | Key Word 1 | Key Word 2 | Key Word 3 |
|---|---|---|---|---|---|
| Data A | 1 | Data Driver 1 | image | car | rally |
| Data B | 2 | Data Driver 2 | movie | actress | car |
| Data C | 3 | Data Driver 1 | sound | mouse | . |

| Name   | Start Sector | Data Driver |
|--------|--------------|-------------|
| Data A | 1            | 1,2         |
| Data B | 2            | 2           |
| Data C | 3            | 3,2         |
| :      | :            | : :         |

| Name          | Start Sector |
|---------------|--------------|
| Data Driver 1 | 10           |
| Data Driver 2 | 11           |
| Data Driver 3 | 12           |
| :             | :            |

~40

INTERCHANGEABLE STORAGE MEDIUM CONTAINING PROGRAM FOR PROCESSING DATA FILES THEREUPON TO MATCH A DATA FILE FORMAT TO A COMPUTER SYSTEM

BACKGROUND OF THE INVENTION

This invention relates to an interchangeable storage medium on which a data file and a program, which subjects the data file to processing so that the file can be utilized by a computer system, are stored in correlated form, to a method of writing/reading data files to/from an interchangeable storage medium, and to a computer system in which this interchangeable storage medium is used as a data input/output medium.

In order to make it possible for a data file that has been stored on an interchangeable storage medium such as a floppy disk or optical disk to be utilized by a computer system, the prior art is such that software for utilizing the data that have been stored on the interchangeable storage medium is required to be stored in the computer system beforehand.

Consequently, a user who desires to use data that have been stored on an interchangeable storage medium is required to register the software (program) for utilizing the data in the computer system, before the data are utilized, in conformity with the format of the data stored on the interchangeable storage medium and the method of keeping the data in storage. The result is poor operability. Moreover, if the software cannot be registered, the data that have been stored on the interchangeable storage medium cannot be utilized. In particular, there are cases where data stored on an interchangeable storage medium can be utilized in one computer system or operating system (OS) but not in another computer system or operating system. In such case it is not possible to perform an exchange of data between computer systems having different architectures or between different operating systems.

Further, in a case where it is desired to limit the computer systems (operating systems) or users that are capable of utilizing data stored on an interchangeable storage medium, or in a case where it is desired to allow data read only and inhibit data write, such control cannot be performed in simple fashion.

Furthermore, according to the prior art, the reading of a data file is performed upon specifying the file name. This means that a data file cannot be read in simple fashion using a retrieval keyword and that a plurality of data files cannot be read using a single retrieval keyword.

Furthermore, a conventional operating system accesses a data file upon defining fixed units of data length (clusters) as well as the layout thereof. If the cluster length is short, therefore, a highly disjointed state is produced and write/read performance deteriorates in the case of data of great length, such as moving-picture data. Conversely, if cluster length is enlarged, unused areas are produced and space efficiency declines when data of comparatively small length, such as text data, are recorded.

SUMMARY OF THE INVENTION

Accordingly, a first object of the present invention is to arrange it so that a user need not separately register software conforming to data format and data storage method in a computer system in order to utilize data files that have been stored on an interchangeable storage medium.

A second object of the invention is to arrange it so that a data file that has been stored on an interchangeable storage medium can be used jointly by computer systems having different operating systems.

A third object of the invention is to arrange it so that a computer system (operating system) or user capable of utilizing a data file that has been stored on an interchangeable storage medium can be limited with ease, and so that conditions under which read/write may take place can be set with facility.

A fourth object of the invention is to arrange it so that a desired data file can be read by entering a retrieval keyword.

A fifth object of the invention is to arrange it so that a data file can be recorded in units of a data size and in a data layout suited to the data file.

In accordance with the present invention, the first object is attained by recording the following on an interchangeable storage medium used in data input/output of a computer system: (1) a data file specified by a file name, (2) a program for subjecting the data file to processing that makes it possible for the data file to be utilized by a computer system, (3) data control information, for each data file, indicating a corresponding relationship among a file name of the data file, a program name of at least one program for applying the above-mentioned processing to a data file specified by the file name, and the location of the data file, and (4) program control information indicating correspondence between a program name and a program location.

In accordance with the invention, the second object is attained by including information, which specifies an operating system in which the program is capable of being used, in the program control information in addition to the corresponding relationship between the program name and program location.

In accordance with the invention, the third object is attained by including information, which specifies an operating system in which the program is capable of being used, as well as information specifying whether a data file is capable of being read/written by the operating system, or specifying read- and write-enable conditions, in the program control information in addition to the corresponding relationship between the program name and program location.

In accordance with the invention, the fourth object is attained by including a retrieval keyword, which is used to retrieve a data file, in the data control information in addition to the corresponding relationship among the file name, the program name and the location of the data file.

In accordance with the invention, the fifth object is attained by including data layout information, which indicates data positions at which data of various size units are recorded, in the data control information in addition to the corresponding relationship among the file name, the program name and the starting position of the data file in a case where a data file is recorded in predetermined data size units.

Other features and advantages of the present invention will be apparent from the following description taken in conjunction with the accompanying drawings.

BRIEF DESCRIPTION OF THE DRAWINGS

FIGS. 11A through 11C are diagrams for describing a first application of the second embodiment;

FIGS. 12A through 12D are diagrams for describing a second application of the second embodiment;

FIG. 23 is a diagram for describing user data control information according to a fourth embodiment of the invention;

FIGS. 33A, 33B are diagrams for describing an application of the sixth embodiment.

DESCRIPTION OF THE PREFERRED EMBODIMENTS (A) Overview of the invention

Figure 1:
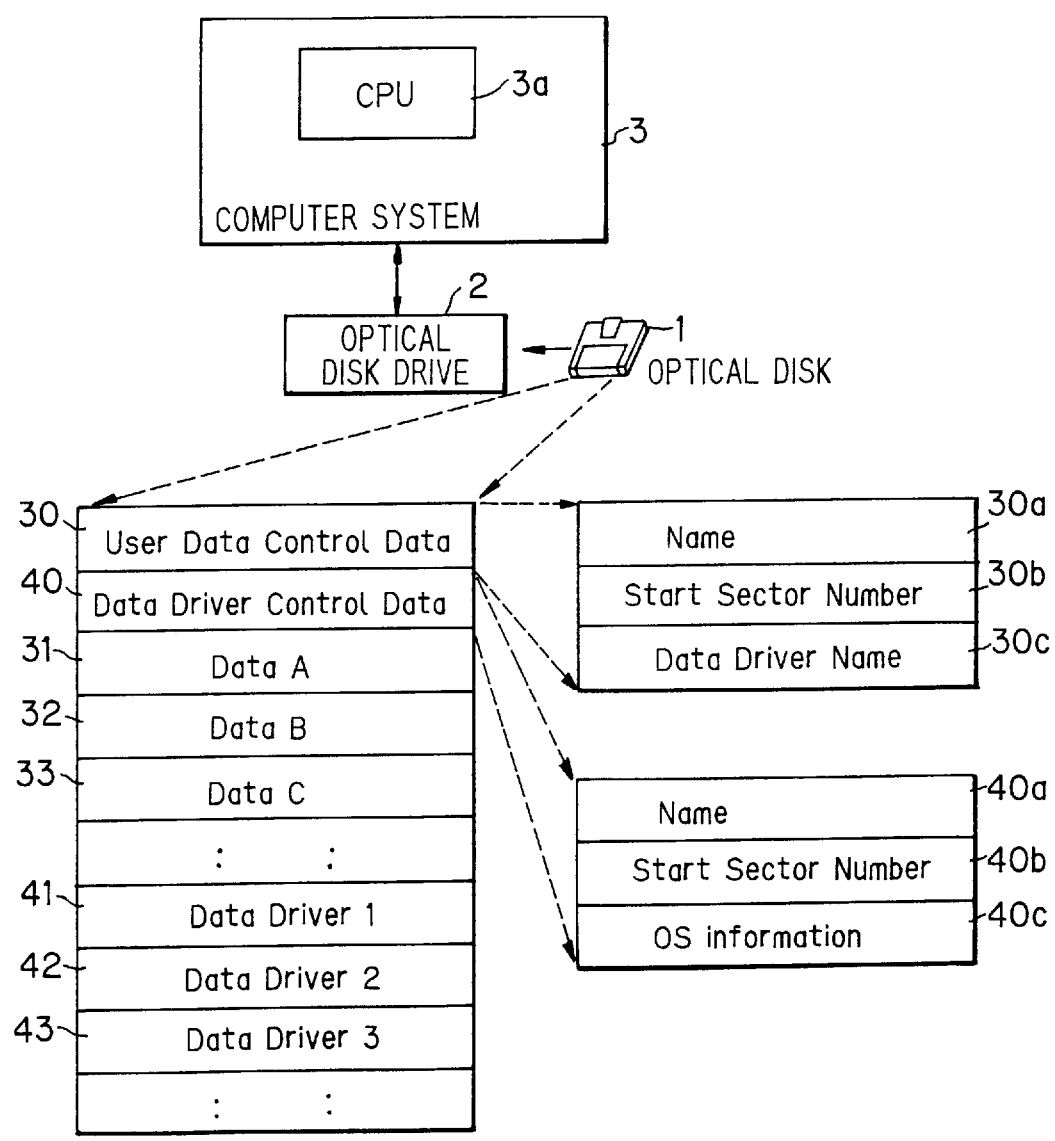
FIG. 1 is a diagram for describing an overview of the present invention.

FIG. 1 is a diagram for describing an overview of the present invention. Shown in FIG. 1 is an interchangeable storage medium 1, an example of which is an optical disk, an optical disk drive unit 2 and a computer system 3 having a central processor (CPU) 3a.

Data control information 30, program control information 40, a plurality of data files (Data A~Data C) 31~33, and programs (Data Driver 1~Date Driver 3) 41~43, which are for subjecting the data files to processing so that the data files can be utilized by the computer system, have been stored on the interchangeable storage medium 1. The data control information 30 indicates, for each data file, the corresponding relationship among (1) a file name 30a of the data file, (2) a location 30b of the data file and (3) a name 30c of a program for subjecting the data file to the processing so that the data file can be utilized by the computer system. The program control information 40 indicates, for each program, the corresponding relationship among (1) a program name 40a of the program, (2) a program location 40b and (3) a name (OS information) 40c of an operating system in which the program is capable of being used. It should be noted, however, that the name of the operating system need not necessarily be stored.

When a data file is written, the processor 3a of the computer system writes a processing program, which is for making it possible for the computer system 3 to subsequently utilize a data file to be written, to the interchangeable storage medium in a form correlated with the data file. When a data file is to be read in, the processor 3a subjects the data file to the processing, such as conversion processing, by the program corresponding to the data file in order that the data file can be utilized by the computer system 3, and then the computer system 3 executes predetermined processing using the processed data file. For example, when a data file has been written to the interchangeable storage medium 1 upon being compressed and is then to be read in from the interchangeable storage medium 1, the processor 3a uses the program corresponding to this data file to restore (decompress) the data file and to convert the data to a data format capable of being processed by the computer system 3.

When a data file is written, the processor 3a writes a processing program, which is for making it possible for the computer system 3 to subsequently utilize a data file to be written, as well as the name of the operating system that is capable of executing this program, to the interchangeable storage medium in correlated form. When a data file is to be read in, the processor 3a subjects the data file to the processing such as conversion processing by using the program which corresponds to the data file and is capable of being used by the operating system of the computer system, in order that the data file can be utilized by the computer system 3, and then the computer system 3 executes predetermined processing using the processed data file. For example, a data file is stored on the interchangeable storage medium 1 in a data format that is not dependent upon the operating system, and processing programs for making this data file utilizable by various computer systems are stored on the interchangeable storage medium. When a computer system equipped with the prescribed operating system reads in a data file, the data file is converted to an executable data format using the program corresponding to this data file to be read, namely the program conforming to the operating system of the computer system.

In addition to (1) the program name 40a, (2) the program location 40b and (3) the name of the operating system in which the program can be used, information specifying whether a data file is capable of being written and read by the operating system or specifying read- and write-enable conditions, is included in the program control information 40. This information specifies whether both reading and writing are enabled, whether only reading is enabled or whether both reading and writing are disabled. As a result, it is possible to limit operating systems or users that are capable of utilizing the data stored on an interchangeable storage medium.

In addition to (1) the file name 30a of the data file, (2) the location 30b of the data file and (3) the name of the program, a keyword for data file retrieval is included in the data control information 30. By designating this retrieval keyword when a data file is to be read, the data file having the designated retrieval keyword is read in.

In a case where a data file is recorded in units of a prescribed data size, the starting position of a data file and data layout information, which indicates the data positions at which data in units of various sizes are to be recorded, are included in the data control information 30 in addition to (1) the file name and (2) the name of the program for deciding the unit of size of these data and the data layout. When a data file is to be read in, the data file is read using the starting position and the data layout information.

(B) First embodiment (a) System configuration

Figure 2:
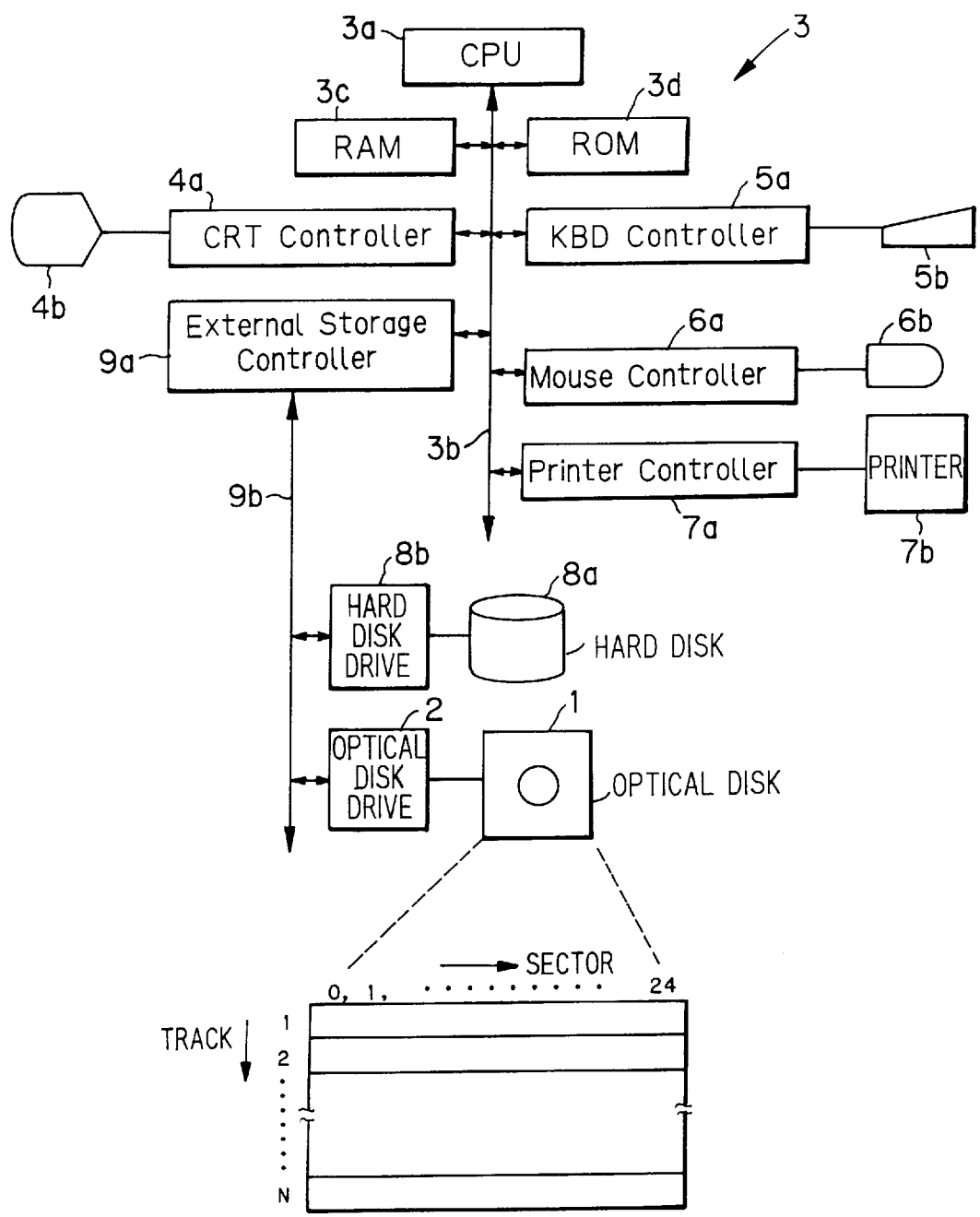
FIG. 2 is a block diagram showing the configuration of a computer system according to the present invention.

FIG. 2 is a block diagram of a computer system according to the present invention. Shown in FIG. 1 are the interchangeable storage medium 1, which is portable as well as interchangeable, an example of which is an optical disk, the optical disk drive unit 2 for reading data (data files and programs) from an optical disk and writing data to the optical disk, and the computer system 3. The computer system 3 includes the central processing unit (CPU) 3a, a bus line (BUS) 3b, a RAM 3c, a ROM 3d, a CRT controller 4a, a display unit (e.g., a CRT) 4b, a keyboard controller 5a, a keyboard 5b, a mouse controller 6a, a mouse 6b, a printer controller 7a, a printer 7b, an external storage device 8a such as a hard disk, a hard disk drive 8b, an external storage controller 9a for controlling each drive, and a bus line 9b for the external storage device.

The optical disk 1 has N-number of tracks, each track consisting of, e.g., 24 sectors. Logical sector addresses are assigned successively from the first sector of the first track to the 24th sector of the Nth track, and sector position is specified by the sector address.

(b) Data structure of interchangeable storage medium

Figure 3:
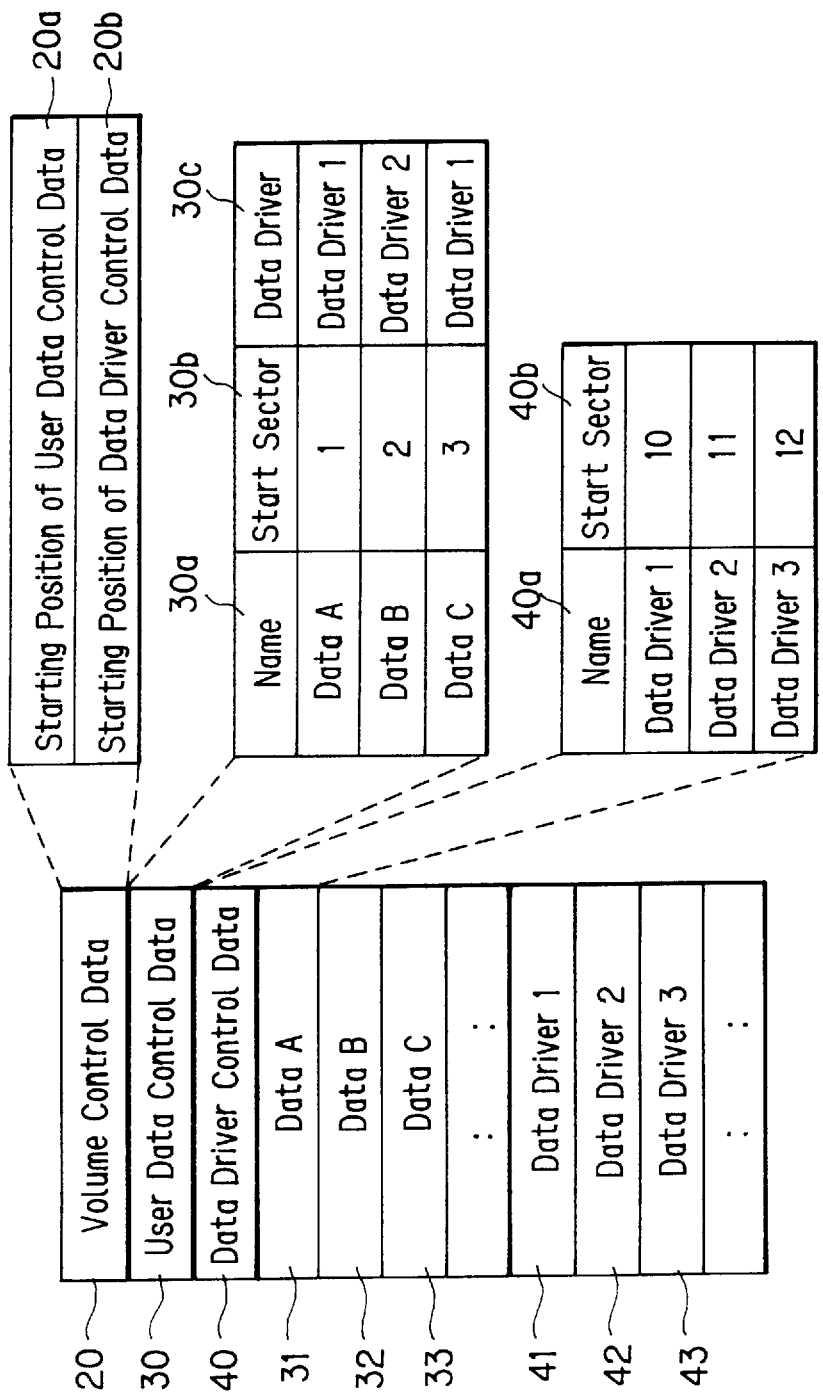
FIG. 3 is a data organization diagram showing the organization of data on an interchangeable storage medium.

As shown in FIG. 3, the following are stored on the optical disk 1 serving as the interchangeable storage medium: volume control information 20, user data control information 30, data driver control information (program management information) 40, a plurality of data files (Data A~Data C) 31~33 and data drivers (Data Driver 1~Data Driver 3) 41~43, which are for subjecting the data files to processing so that the data files can be utilized by a computer system.

The volume control information 20, which is written on the optical disk 1 at a predetermined location, includes (1) data 20a indicating the starting position of the data control information 30 and (2) data 20b indicating the starting position of the data driver control information 40. The user data control information 30 indicates, for each data file, the corresponding relationship among (1) the file name (Data A~Data C) 30a, (2) the starting position of the data file (the position of the file starting sector) 30b and (3) the name (Data Driver 1~Data Driver 3) 30c of a data driver (program) for subjecting the data file to processing so that the data file can be utilized by a computer system. The data driver control information 40 indicates, for each data driver, the corresponding relationship among (1) a data driver name (Data Driver 1~Data Driver 3) 40a and (2) a data driver starting position (data driver starting sector) 40b.

(c) Overview of operation

The computer system 3 operates in accordance with an operating system (OS) implemented by a program, or by cooperation among individual programs, included in the ROM 3d or on any external storage device such as the interchangeable storage medium 1 or hard disk 8a.

When a request (e.g., a data file read command) for acquisition of a data file from the interchangeable storage medium 1 is issued by a program or from the keyboard 5b, the CPU 3a refers to the user data control information 30, which has been recorded on the medium, acquires the starting position 30b of the data file of interest and the name 30c of the data driver for subjecting this data file to processing so that the data file can be utilized by a computer system, and stores the starting position 30b and name 30c in the RAM 3c.

Next, the CPU 3a refers to the data driver control information 40, finds the starting position of the data driver having the data driver name that has been acquired and stores this starting position in the RAM 3c. The CPU 3a subsequently reads the data driver out of the RAM 3c, reads out the data file from the starting position of the acquired data file of interest and uses this data driver to process the data file into a format in which the file can be utilized by the computer system. The CPU 3a thenceforth subjects this processed data file to separately specified processing.

(d) Data file read processing

Figure 4:
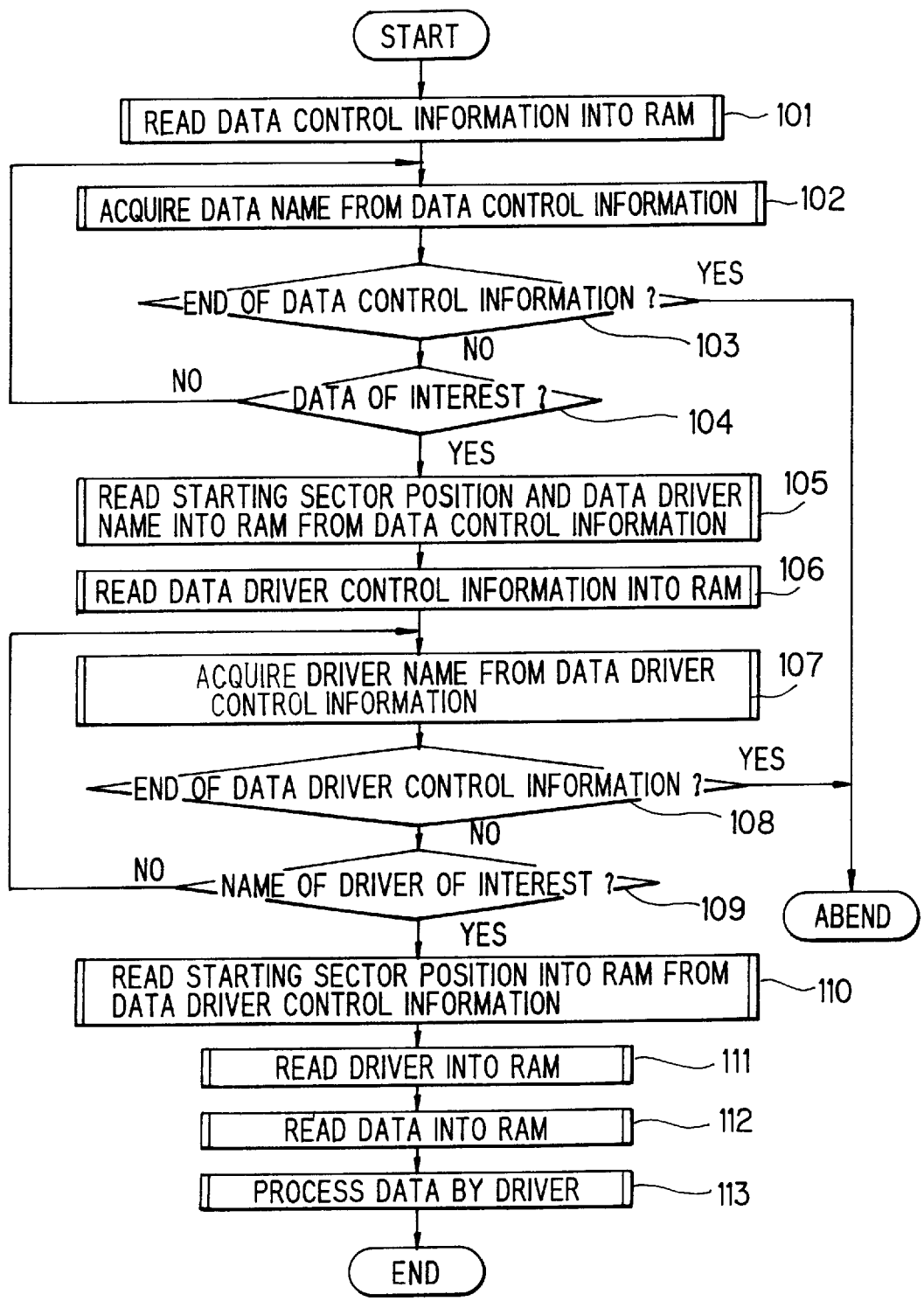
FIG. 4 is a flowchart of processing for reading in a data file according to a first embodiment.

FIG. 4 is a flowchart of processing for reading in a prescribed data file from the interchangeable storage medium 1 in accordance with a first embodiment.

When a command for reading a prescribed data file is issued, the CPU 3a reads the user data control information 30 into the RAM 3c (step 101). Next, from the user data control information 30, the CPU 3a obtains the file name (data name) that coincides with the file name (data name) specified by the read command (steps 102~104). If the file name specified by the read command does not exist in the user data control information 30, this means that the file has not been recorded on the interchangeable storage medium 1; hence, the CPU 3a terminates processing (abnormal end: abend).

On the other hand, if the above-mentioned file name does exist in the user data control information 30, then the CPU 3a acquires the data file starting position and data driver name that have been stored in correspondence with this file name (step 105). For example, assume a case where an attempt is made to acquire the data file whose name is Data A. If the data control information of the kind shown in FIG. 3 has been recorded on the interchangeable storage medium 1, then "1" is acquired as the starting sector position and "Data Driver 1" is acquired as the data driver name. The CPU 3a subsequently reads the data driver control information 40 into the RAM 3c (step 106) and acquires the data driver control information having the data driver name found at step 105 from the data driver control information 40 (steps 107~109).

If the data driver found at step 105 does not exist in the data driver control information 40, this means that the data driver has not been recorded on the interchangeable storage medium 1; hence, the CPU 3a terminates processing (abnormal end: abend).

On the other hand, if the data driver name does exist in the data driver control information 40, then the CPU 3a acquires the recording starting position of the data driver that has been stored in correspondence with this data driver name and stores this position in the RAM 3c (step 110). In the example mentioned above, the starting position "10" of "Data Driver 1" is acquired. The CPU 3a subsequently reads the data driver into the RAM 3c from the above-mentioned starting position and reads the data file into the RAM 3c from the starting position obtained at step 105 (steps 111~112). The CPU 3a thenceforth subjects the data file to prescribed processing by the read data driver in such a manner that the data file will by utilizable by a computer system (step 113).

For example, when a data file has been written to the interchangeable storage medium 1 upon being compressed and is then to be read in from the interchangeable storage medium 1, the processor 3a uses the data driver corresponding to this data file to restore (decompress) the data file and to convert the data to a data format capable of being processed by the computer system 3.

(e) Data file write processing

When a data file is written, there are three methods available to select the data driver that subjects the data file to processing. The first method is one in which the user makes the selection, the second is one in which the application makes the selection, and the third is one in which the data driver itself makes the selection.

(e-1) Processing for selecting the data driver by the first method

Figure 5:
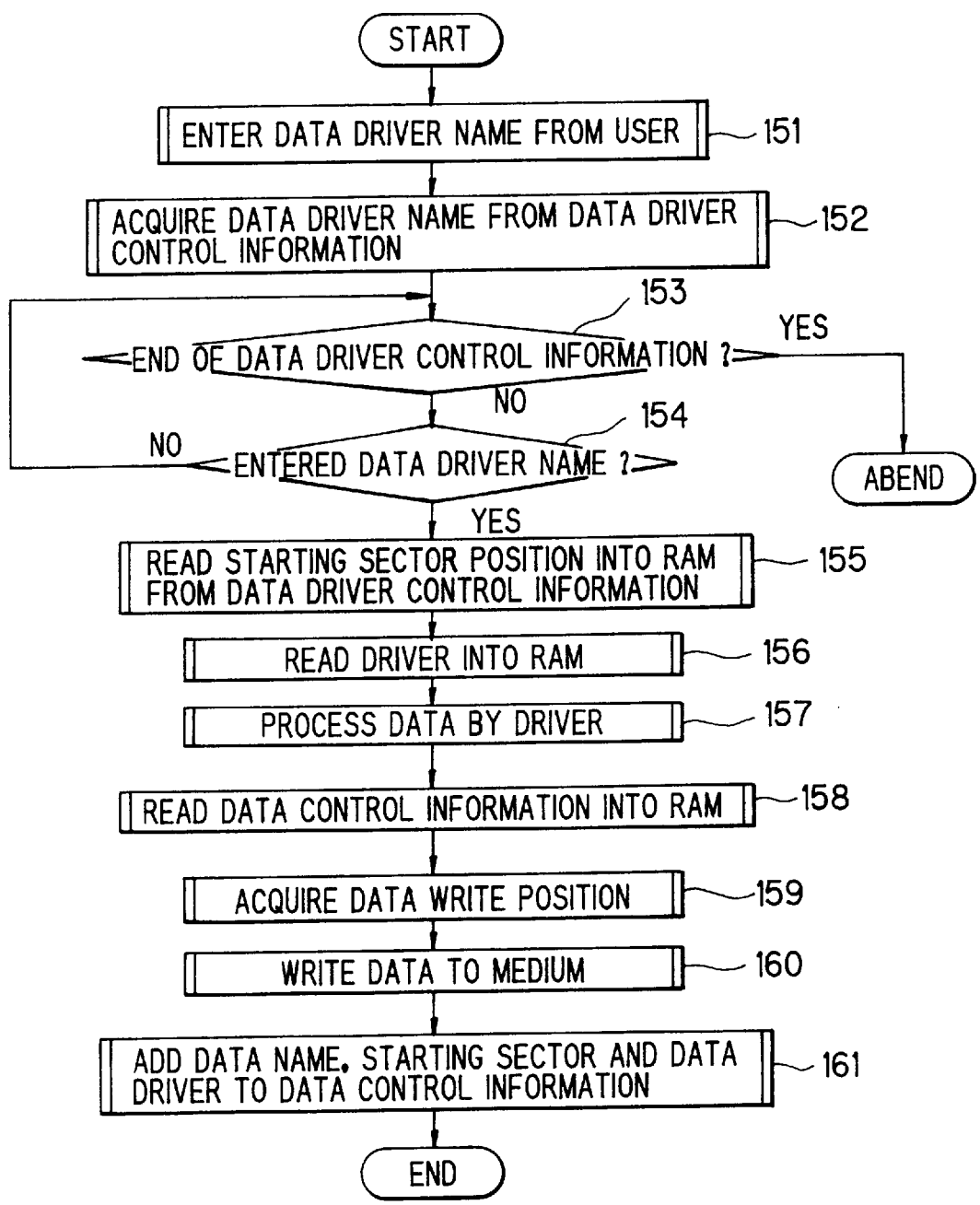
FIG. 5 is a flowchart of write processing according to the first embodiment, in which the user selects a data driver.

FIG. 5 is a flowchart of write processing according to the first embodiment, in which a data driver is selected by the first method to write a data file to the interchangeable storage medium 1.

At the start of data-file write, the user enters a data driver name or information specifying a data driver corresponding thereto (step 151). For example, by issuing an instruction "Set Data Driver=Driver 1" from an input device such as the keyboard, the data driver can be clearly specified.

The CPU 3a then determines whether the specified data driver exists in the data driver control information 40 (steps 152~154). If the data driver exists, then the CPU 3a executes write processing from step 155 onward. On the other hand, if the specified data driver does not exist in the data driver control information 40, then this data driver is not present in the interchangeable storage medium 1 and processing is ended (abnormal end: abend).

If the data driver exists, then the CPU 3a acquires the recording starting position of the specified data driver from the data driver control information 40 and stores it in the RAM 3c (step 155). The CPU 3a thenceforth reads the data driver from this starting position into the RAM 3c (step 156) and uses this data driver to subject the data file to predetermined processing (step 157).

At the completion of this processing, the CPU 3a reads in the user data control information 30 from the interchangeable storage medium 1 (step 158), acquires a position at which the data file is to be recorded (step 159) and writes the processed data file at this recording position (step 160). The CPU 3a thenceforth produces user data control information indicating the corresponding relationship among the file name of the data file, the name of the data driver and the position at which the data file is written and writes this information to the interchangeable storage medium (step 161).

The first method in which the user selects the data driver is used in the following case: For example, if the first Data Driver 1, for which there is to be no restriction on users, and the second Data Driver 2, which prompts for entry of a password to restrict utilization, exist on the interchangeable storage medium 1, the user selects the Data Driver 1 in a case where utilization of text data is not restricted at recording of a created text data file. The user selects the Data Driver 2 in a case where the users are to be limited.

(e-2) Processing for selecting the data driver by the second method

The second method of selecting a data driver is that in which the application selects the data driver. Data formats dealt with by various applications are decided in advance, as in the manner of text data for word processors and table calculation data for table calculation software. When a created data file is written, the application automatically issues an instruction, e.g., "Set Data Driver=Driver 1", to select the data driver that conforms to its own data format. The flowchart of processing for writing a data file by the second method is substantially the same as the flowchart of FIG. 5. The only difference is that, at step 151, the application enters the data driver name by the above-mentioned instruction or enters information specifying the data driver before the writing of data is performed. The processing from step 152 onward is exactly the same as that of FIG. 5.

(e-3) Processing for selecting the data driver by the second method

Figure 6:
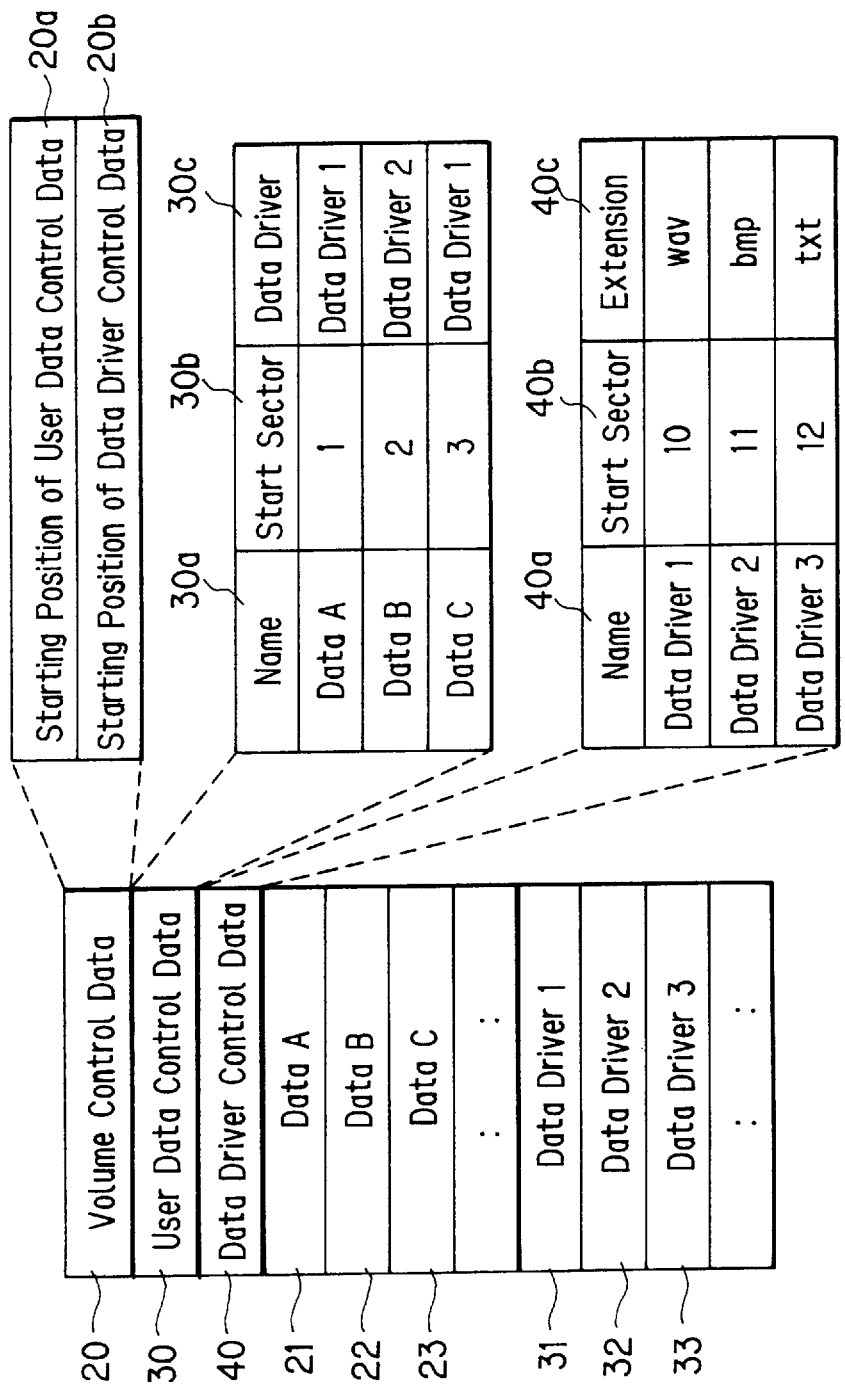
FIG. 6 is a diagram of the structure of data on an interchangeable storage medium in a case where an extension has been included in data driver control information.

The third method of selecting a data driver is that in which the data driver itself judges whether it can deal with the data about to be written, with this data driver being used if the decision is that the data can be handled. In a case where data are written, a file name on the medium such as "data A.txt" is specified in a command "Write", which specifies writing, in the manner "Write data A.txt,", by way of example. What follows the period "." in this file name is referred to as an extension. This specifies the content of the file, i.e., "txt" in the case of a text file, "bmp" in the case of image data and "wav" in the case of musical data. Accordingly, an extension is defined when a data driver is created and, as shown in FIG. 6, the data driver starting position 40b and extension 40c are stored on the interchangeable storage medium 1 in association with the data driver name 40a. If this expedient is adopted, a data driver can be selected from the data driver control information 40 using the extension of the file name as a keyword when the above-mentioned write command is generated.

Figure 7:
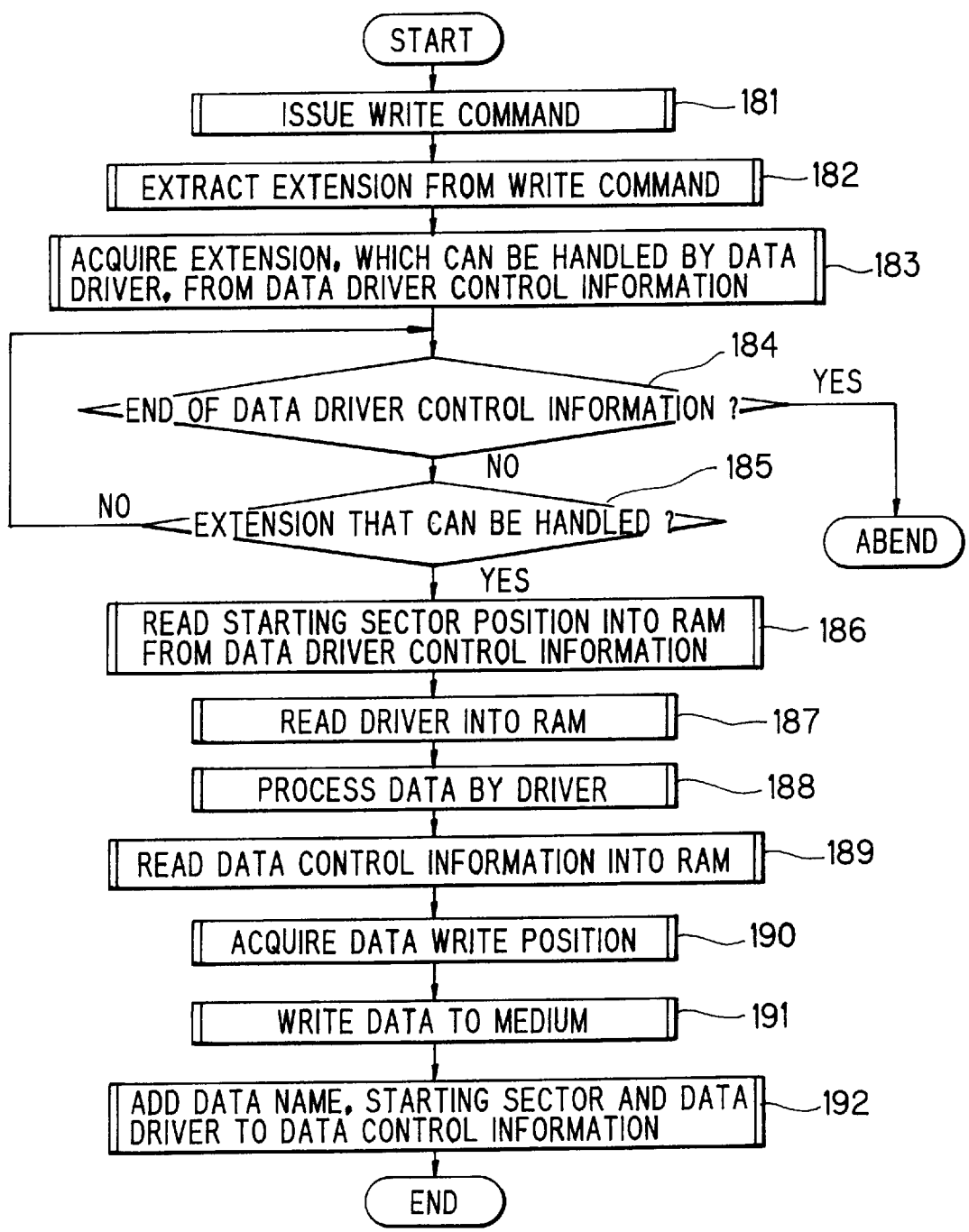
FIG. 7 is a flowchart of write processing according to the first embodiment, in which a data driver is selected using an extension of a file name.

FIG. 7 is a flowchart of write processing according to the first embodiment, in which a data driver is specified by the third method and written to the interchangeable storage medium 1.

When a write command "Write data A.txt" is generated (step 181), the CPU 3a extracts the extension "txt" (step 182). Next, starting from the beginning of the data driver control information 40, the CPU 3a extracts extensions that are capable of being handled by each data driver (steps 183~185). In the example of the data driver control information 40 shown in FIG. 6, the extensions that can be handled by the first and second data drivers Data Driver 1 and Data Driver 2 are "wav" and "bmp", respectively, and therefore these data drivers are not selected. However, the extension that can be handled by the third data driver Data Driver 3 is "txt", which matches the extension contained in the write command. Accordingly, the data driver Data Driver 3 is selected and the ensuing write processing is executed. If a data driver for dealing with the extension of a data file contained in the write command does not exist, processing is terminated in an abnormal end.

The CPU 3*a* thenceforth executes processing similar to that of FIG. 5 to write the data file specified by the write command in the interchangeable storage medium 1. More specifically, the CPU 3*a* acquires the recording starting position of the data driver from the data driver control information 40 and stores this position in the RAM 3*c* (step 186). The CPU 3*a* subsequently reads the data file into the RAM 3*c* from this starting position (step 187) and subjects this data file to predetermined processing using the above-mentioned data driver (step 188).

Following this processing, the CPU 3*a* reads the user data control information 30 in from the interchangeable storage medium 1 (step 189), acquires a position at which the data file is to be recorded (step 190) and writes the processed data file at this recording position (step 191). The CPU 3*a* thenceforth produces user data control information indicating the corresponding relationship among the file name of the data file, the name of the data driver and the position at which the data file is written and writes this information to the interchangeable storage medium (step 192).

The foregoing illustrates an example in which a data driver is selected by an extension. However, there are many cases where an ASCII character string or the like for specifying the data format has been imbedded in a data file. In such cases, therefore, an arrangement can be adopted in which the data driver starting position 40*b* and ASCII character string are made to correspond to data driver name 40*a* in the data driver control information 40. Then, when the data file write command is generated, the data driver is selected by referring to the ASCII character string contained in this data file. Of course, this method may be used in combination with extensions.

In the description of the first embodiment, data file read/write and data file processing take place separately. However, read/write may be performed while processing is being executed in successive fashion.

In a case where an image data file is utilized as a data file in the first embodiment, the data file is recorded on the interchangeable storage medium 1 in a format such as JPEG or TIFF, etc., and the program for making the conversion to a data format suited to a certain operating system is registered as the data driver. If this arrangement is adopted, the operating system need not be concerned with the type of format of the recorded image data. The operating system can read in the data driver and the data file in the form of a pair and process (convert) the data file using the data driver. The image data can thus be utilized by way of this processing procedure.

In a case where a data file is recorded on the interchangeable storage medium 1, the writing of the data file is performed through the procedure of reading in the data driver, processing the data file and writing the processed data file. Accordingly, in a case where a data file having a special data format or a novel data format is utilized, a data driver need only be created and stored on the interchangeable storage medium together with the data file. This makes it possible to use the data file without changing the operating system.

(C) Second embodiment (a) Overview of second embodiment

A second embodiment of the invention is so adapted that a data file can be used by different operating systems. The system configuration is that same as that of the first embodiment shown in FIG. 2.

Figure 8:
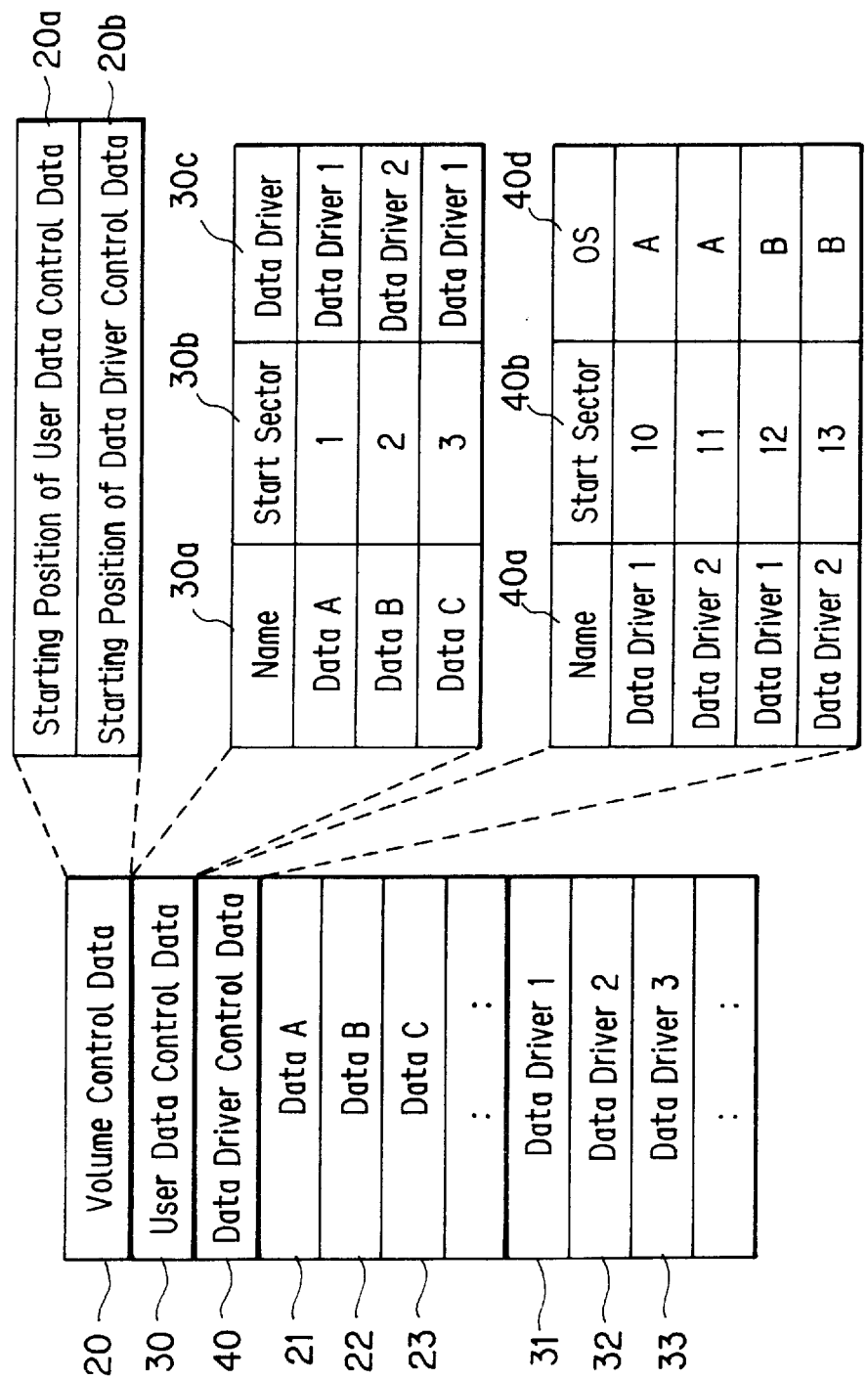
FIG. 8 is a diagram showing the structure of data on an interchangeable storage medium according to a second embodiment of the invention.

The optical disk 1 serving as the interchangeable storage medium has a data storage structure substantially the same as that of the first embodiment of FIG. 3, as illustrated in FIG. 8. The first difference between this embodiment and the first embodiment is that the data driver control information 40 includes, for each data driver, (3) the name 40*d* of an operating system that is capable of using a data driver in addition to (1) the data driver name (Data Driver 1~Data Driver 3) 40*a*, (2) the data driver starting position (data driver starting sector) 40*b* and (3) the name 40*d* of the operating system capable of using the data driver. The second difference is that there are two or more items of data driver control information having the same data driver name, with the same data drivers having different operating systems associated with them. In other words, two operating systems A and B are registered in associated with Data Driver 1, and two operating systems A and B are registered in association with Data Driver 2.

A data file is recorded on the interchangeable storage medium 1 in a data format that is not dependent on the operating system, and a processing program (data driver) for making this data file utilizable by a computer system is stored in conformity with each operating system. When a computer system having a prescribed operating system reads in a data file, the data file is converted to a data format, which is capable of being processed by the operating system, using the data driver corresponding to the data file to be read in, this data driver conforming to its own operating system.

(b) Data file read processing according to second embodiment

Figure 9:
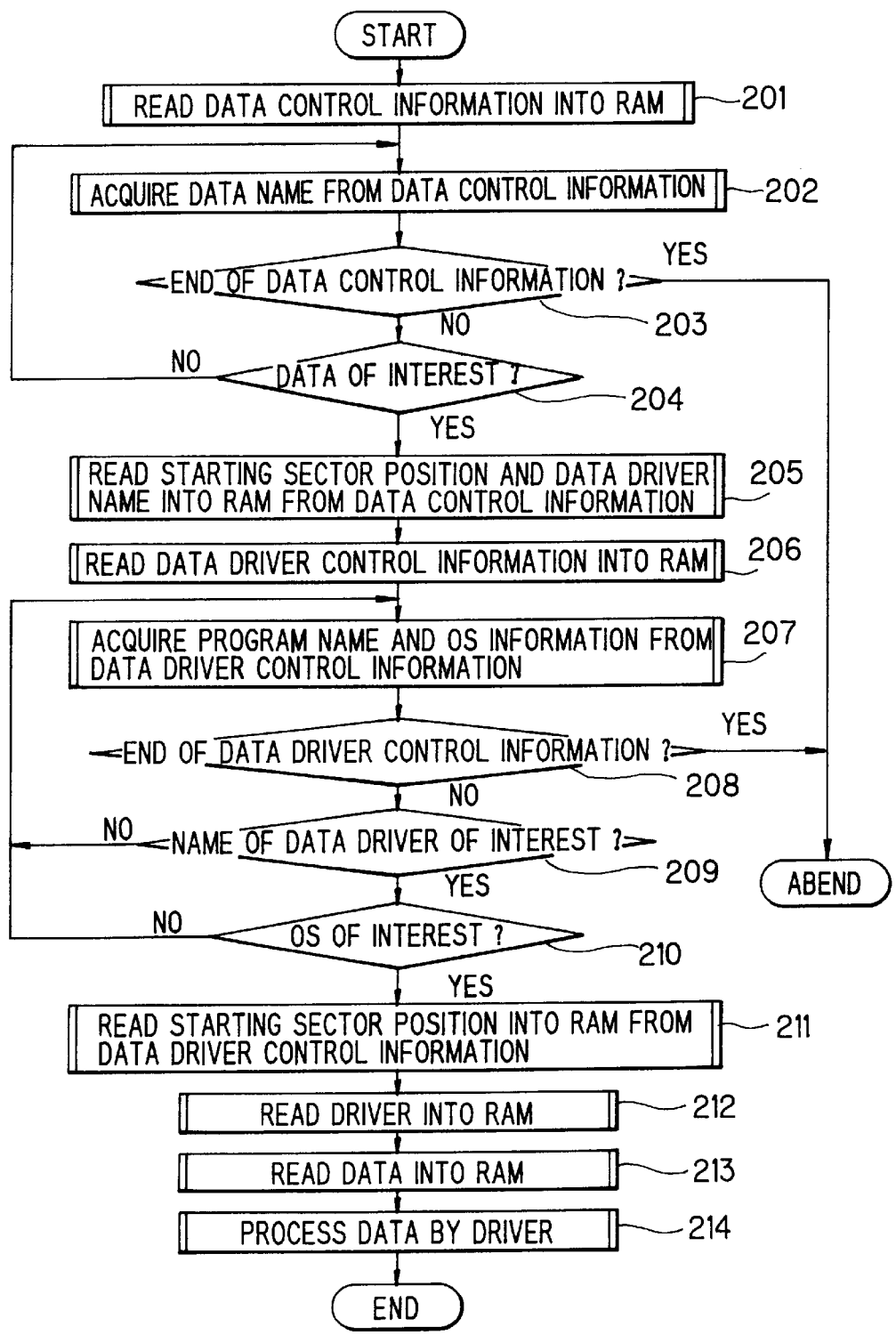
FIG. 9 is a flowchart of processing for reading in a data file according to the second embodiment.

FIG. 9 is a flowchart of processing for reading in a data file in accordance with the second embodiment.

When a command for reading a data file is issued, the CPU 3*a* reads the user data control information 30 into the RAM 3*c* (step 201). Next, from the user data control information 30, the CPU 3*a* obtains the file name (data name) that matches file name specified by the read command (steps 202~204). If the file name specified by the read command does not exist in the user data control information 30, the CPU 3*a* terminates processing (abnormal end: abend).

On the other hand, if the above-mentioned file name does exist in the user data control information 30, then the CPU 3*a* acquires the data file starting position and data driver name that have been stored in correspondence with this file name (step 205). The CPU 3*a* then reads the data driver control information 40 into the RAM 3*c* (step 206) and acquires the data driver control information of the data driver having the data driver name found at step 205 from the data driver control information 40, this being the data driver that is executable (usable) by its own operating system (steps 207~210). The CPU 3*a* then executes read processing from step 211 onward.

On the other hand, if the data driver which has the data driver name found at step 205 and which is executable (usable) by its own operating system does note exist, processing is terminated (abnormal end: abend).

Following the execution of step 210, the CPU 3a acquires the recording starting position of the data driver and stores this position in the RAM 3c (step 211). The CPU 3a subsequently reads the data driver into the RAM 3c from the above-mentioned starting position and reads the data file into the RAM 3c from the starting position obtained at step 205 (steps 212~213). The CPU 3a thenceforth subjects the read data file to prescribed processing by the read data driver in such a manner that the data file will by utilizable by a computer system (step 214).

Thus, in a case where the data file Data File A is read in when the user data control information 30 and data driver control information 40 have been registered in the interchangeable storage medium 1, as shown in FIG. 1, "Data Driver 1" is obtained from the user data control information 30 as the data driver which applies processing to the data file. Next, when reference is made to the data driver control information 40 shown in FIG. 8, it is found that two types of "Data Driver 1" have been recorded owing to different operating systems. If the operating system being used by the computer system 3 is OS/B, then "12" can be specified as the data driver starting position, Data Driver 1 is read in from this starting position and data file Data A is subjected to predetermined processing by this data driver.

(c) Data file write processing according to the second embodiment

Figure 10:
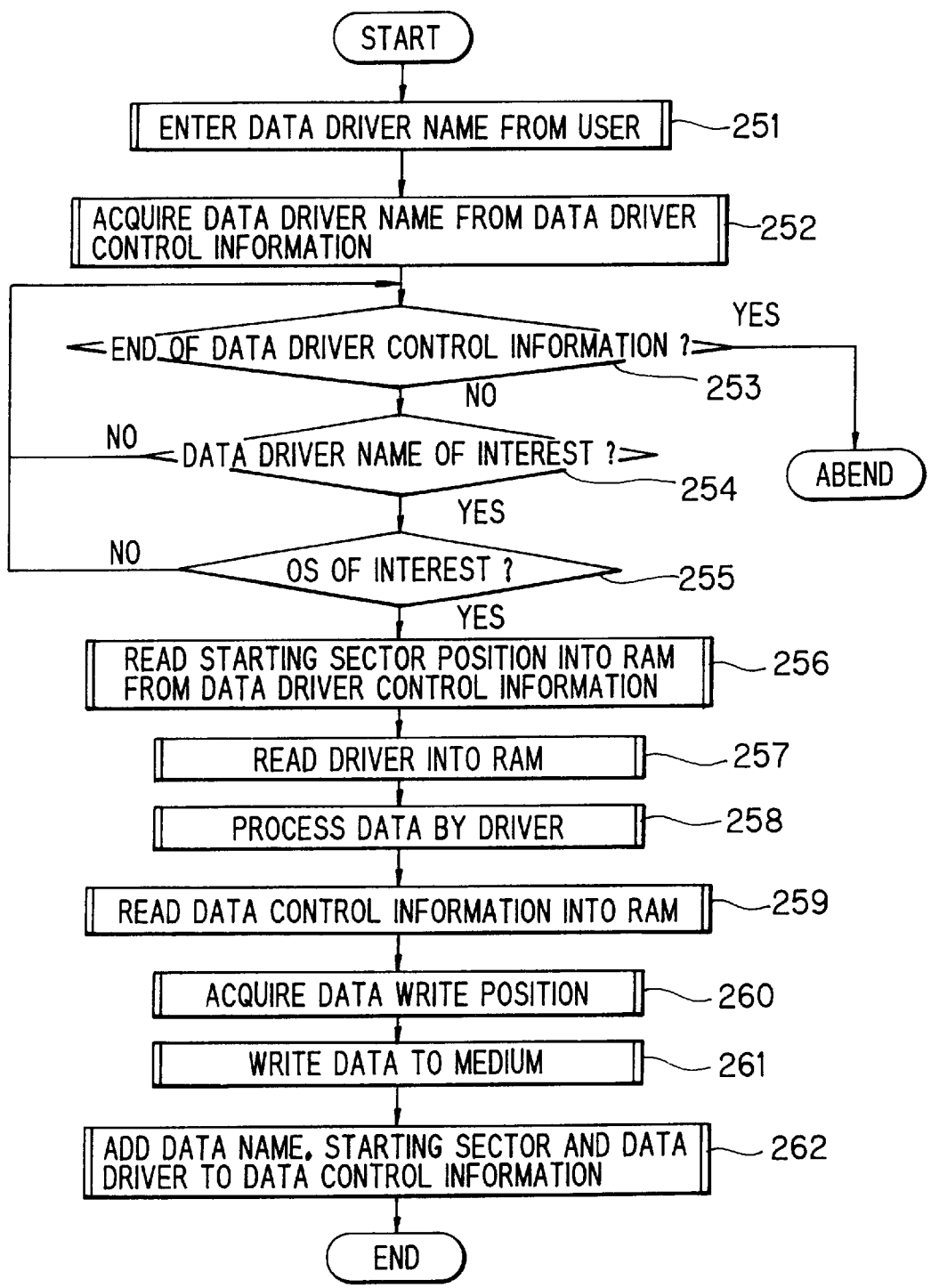
FIG. 10 is a flowchart of processing for writing a data file according to the second embodiment.

FIG. 10 is a flowchart of write processing according to the second embodiment. This is for a case where the user selects the data driver.

At the start of data-file write, the user enters a data driver name or information specifying a data driver corresponding thereto (step 251). For example, by issuing an instruction "Set Data Driver=Driver 1" from an input device such as the keyboard, the data driver can be clearly specified.

The CPU 3a then determines whether the data driver which has the specified data driver name and which is usable by its own operating system exists in the data driver control information 40 (steps 252~255). If the data driver exists, then the CPU 3a executes write processing from step 256 onward. On the other hand, if the specified data driver does not exist in the data driver control information 40, then this data driver is not present on the interchangeable storage medium 1 and processing is ended (abnormal end: abend).

If the data driver exists, then the CPU 3a acquires the recording starting position of the specified data driver from the data driver control information 40 and stores it in the RAM 3c (step 256). The CPU 3a thenceforth reads the data driver from this starting position into the RAM 3c (step 257) and uses this data driver to subject the data file to predetermined processing (step 258).

At the completion of this processing, the CPU 3a reads in the user data control information 30 from the interchangeable storage medium 1 (step 259), acquires a position at which the data file is to be recorded (step 260) and writes the processed data file at this recording position (step 261). The CPU 3a thenceforth produces data control information indicating the corresponding relationship among the file name of the data file, the name of the data driver and the position at which the data file is written and writes this information to the interchangeable storage medium (step 262).

(d) Applications of second embodiment (d-1) First application

In accordance with the second embodiment, a data file is recorded on the interchangeable storage medium 1 in a data format that is not dependent on the operating system, and a processing program (data driver) for making this data file utilizable by a computer system is stored in conformity with each operating system. When a computer system having a prescribed operating system reads in a data file, the data file is converted to a data format, which is capable of being processed by the operating system, using the data driver which corresponds to the data file to be read in and which conforms to its own operating system.

FIGS. 11A through 11C are diagrams for describing a first application of the second embodiment, in which FIG. 11(A) is a partial character string of a text data file Data A created by an ASCII code, FIG. 11(B) a character string expressed in the Shift-JIS format capable of being handled by operating system OS/A, and FIG. 11(C) a character string expressed in the JIS format capable of being handled by operating system OS/B.

It will be assumed that the operating system OS/A deals with text data in the character code format Shift-JIS, that the operating system OS/B deals with text data in the character code format JIS and that the text data file Data A has been recorded on the interchangeable storage medium 1 by ASCII code. In order for the data file Data A that has been recorded on the interchangeable storage medium 1 to be read in the OS/A in this case, the OS/A refers to the user data control information 30 and retrieves the description relating to the data file Data A. As a result of retrieval, the OS/A acquires the starting position of the data file Data A and the name (Data Driver 1) of the data driver. Next, the OS/A refers to the data driver control information 40 and makes reference to the information relating to the data driver Data Driver 1. With regard to the data driver Data Driver 1, one for OS/A and one for OS/B are found in the example of FIG. 8. However, since the operating system making reference is OS/A, the starting position information (starting sector 10) relating to Data Driver 1 associated with OS/A is capable of being acquired. Accordingly, Data Driver 1 relating to OS/A is read into memory. The Data Driver 1 for OS/A has a function for converting the ASCII-format text data that has been recorded on the interchangeable storage medium 1 to the text data having the Shift-JIS format. Consequently, at the same time that the data file Data A is read out of the interchangeable storage medium 1, or after this data file has been placed in storage in memory, it is possible to make a data conversion from the data file Data A in the ASCII format to data in the Shift-JIS format by the data driver Data Driver 1 for the OS/A. The result is a data format capable of being used by the operating system OS/A.

In the case of OS/B, the data driver Data Driver 1 for the OS/B is selected when reference is made to the data driver control information 40 of FIG. 8, and this data driver is read in the memory. The Data Driver 1 for the OS/B has a function for converting ASCII-format text data to JIS-format text data. Therefore, by making a conversion the same as that in the case of OS/A, it is possible to obtain the data format that is usable by OS/B.

The operation for writing data is performed as follows: If text data in the shift-JIS format are recorded on the medium in the operating system OS/A, the data driver Data Driver 1 for the OS/A is selected from the user data control information 30, the Data Driver 1 for OS/A makes the conversion from shift-JIS to ASCII and records the data file on the interchangeable storage medium 1 in the ASCII format. In a case where HIS-format text data are recorded on the medium in OS/B, the Data Driver 1 for OS/B is selected, the Data Driver 1 for OS/B makes the conversion from JIS to ASCII and records the data file on the interchangeable storage medium 1 in the ASCII format.

In the example cited above, the data format conversion described relates to text data. However, the description holds true for various types of data files, such as musical data files and table-calculation data files. More specifically, among limitations based upon the resources capable of being utilized by the operating system, the operating system supports one format most suitable for itself with regard to each of various types of data and uses a data driver to apply processing to a data file so as to be line with this format, thereby making it possible for data to be readily exchanged between different operating systems.

(d-2) Second application

FIGS. 12A through 12D are diagrams for describing a second application. This is a case where the OS/A handles images in a bitmap format, the OS/B handles image data in a RAW format and a data file Data A is recorded on the interchangeable storage medium 1 in the JPEG format, which is independent of the operating system.

With regard to 8×8 pixels shown in FIG. 12(A), assume that the user has created image data, which is expressed by one byte per pixel, in the operating system OS/B. Since the OS/B handles a data format (i.e., the RAW format) simply for images, the data format becomes as shown in FIG. 12(B). To record this on the interchangeable storage medium, the data driver for OS/B records the RAW-format image data upon converting these data to the JPEG format. More specifically, first the data driver transforms the RAW-format image data to data of a spatial frequency area using DCT (discrete cosine transformation). Next, the data driver quantizes each frequency component using a quantization table such as a Huffman table, then performs entropy encoding to effect a conversion to the JPEG-format image data shown in FIG. 12(C) and records the JPEG-format image data obtained by this conversion on the interchangeable storage medium 1.

In a case where JPEG-format image data that have been recorded on the interchangeable storage medium 1 are used in the operating system OS/A at a later time, the data driver for OS/A subjects the JPEG image data to entropy decoding in memory, performs inverse quantization using a quantization table and then applies inverse DCT to reproduce the RAW-format image data. The data driver then rearranges the layout of the data and converts the data to the bitmap format, which is executable by the OS/A, as shown in FIG. 12(D).

In this example, a conversion from the OS/B to the OS/A has been described. However, the description holds in similar fashion for a conversion from the OS/A to the OS/B. Further, the description holds for formats (such as the TIFF format) other than the RAW, JPEG and bitmap formats. The same is true even in case of a moving picture, which is composed of a plurality of items of image data.

(d-3) Third application

The size of a data file recorded on an interchangeable storage medium can be reduced by making the data driver a program which compresses and decompresses data. If such a data driver is used, decompression processing (processing for restoring compressed data) is performed by this data driver at the data processing of step 214 in FIG. 9 and data compression processing is performed at the data processing of step 258 in FIG. 10.

Figure 13:
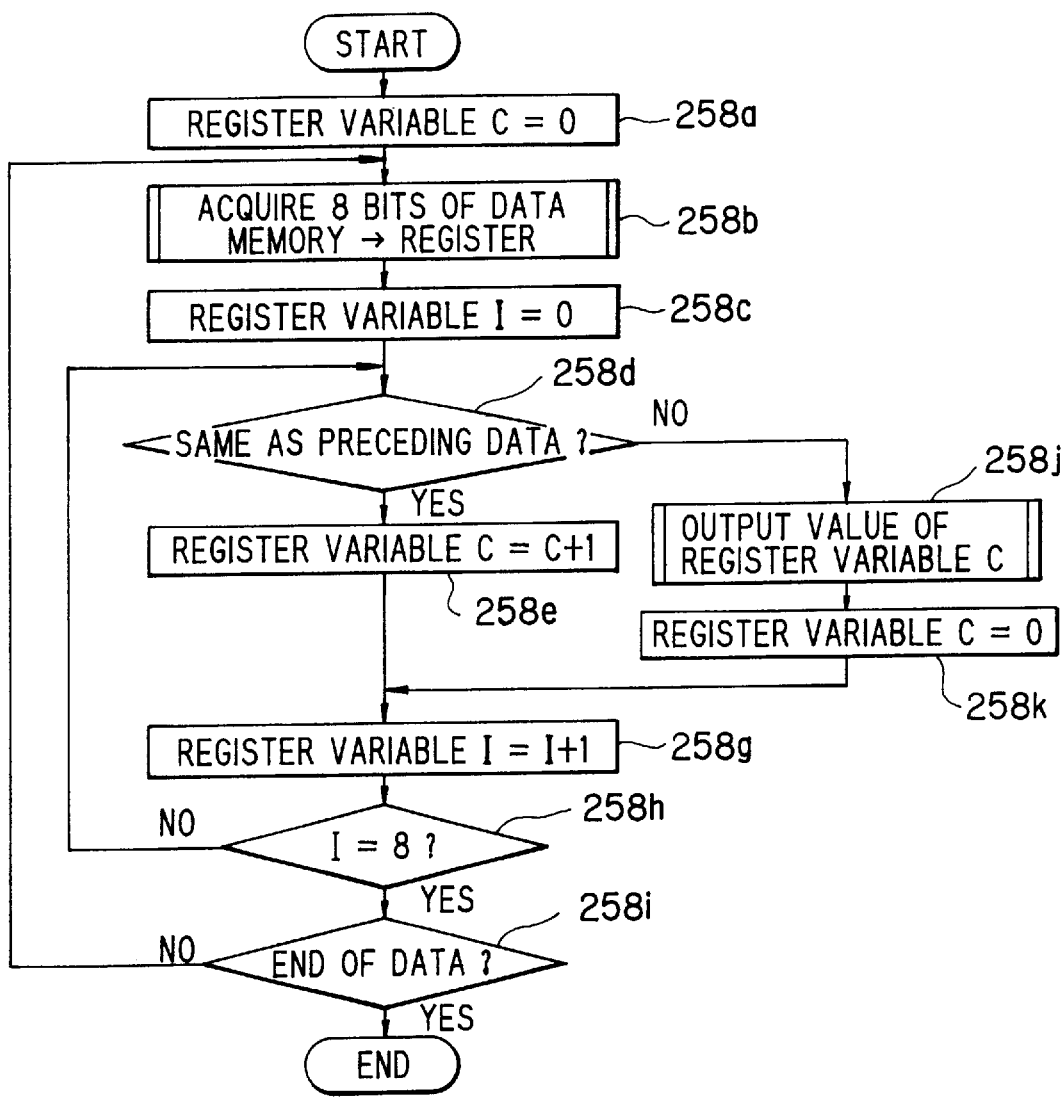
FIG. 13 is a flowchart of processing in a data driver.

Various methods have been proposed as methods of performing compression/decompression. By way of example, FIG. 13 illustrates the flow of processing for data compression in a case where the run-length method is used as the method of compression. When "1" or "0" data run in continuous fashion, the run-length method is such that compression is performed by recording the amount of this continuity. At the data processing (compression processing) of step 258 in FIG. 10, the CPU 3$a$ sets a first register variable C to zero and then takes n (e.g., eight) bits of data from the memory in which the data to be compressed have been stored and places these data in the register (steps 258$a$ and 258$b$). Next, the processor 3$a$ sets a second register variable I to zero (step 258$c$) and checks every bit to see if it is the same as the preceding bit. If the bit is the same, the CPU 3$a$ counts up C, counts up and checks to see whether I=8 holds (steps 258$d$~258$h$). If I<8 holds, then the CPU 3$a$ repeats the processing from step 258$d$ onward. If I=8 holds, the processor 3$a$ checks to see whether this is the end of the data (step 258$i$). If the answer is "NO", then the program returns to step 258$b$, the CPU 3$a$ reads in the next eight bits of data and continues processing. If it is found at step 158$d$ that a bit is different from the bit that precedes it, the CPU 3$a$ outputs the register variable C (the number of consecutive "1" or "0") (step 258), then clears this register variable to zero (step 258$k$) and subsequently executes processing from step 258$g$ onward.

In the example of compression set forth above, the data taken from the memory and placed in the register consist of eight bits. However, owing to a difference in the CPU and OS of the computer system used, the amount n of data capable of being acquired at one time differs in the manner 8 bits, 16 bits, 32 bits, 64 bits and so on, and the larger the value of n, the more efficient processing becomes. Accordingly, a data driver for performing data compression/decompression with a data quantity n=16 is adopted as the data driver for OS/A, a data driver for performing data compression/decompression with a data quantity n=32 is adopted as the data driver for OS/B, and these are registered on the interchangeable storage medium 1. By using the data driver selectively depending upon the operating system, the maximum possible performance can be attained.

Though the run-length method has been described as the method of data compression, the invention is not limited to this method.

(D) Third embodiment

The third embodiment limits the environment in which a data file stored on an interchangeable storage medium is utilized as well as the users of the data file. The system configuration is the same as that of the first embodiment shown in FIG. 2.

(a) Data structure of interchangeable storage medium

Figure 14:
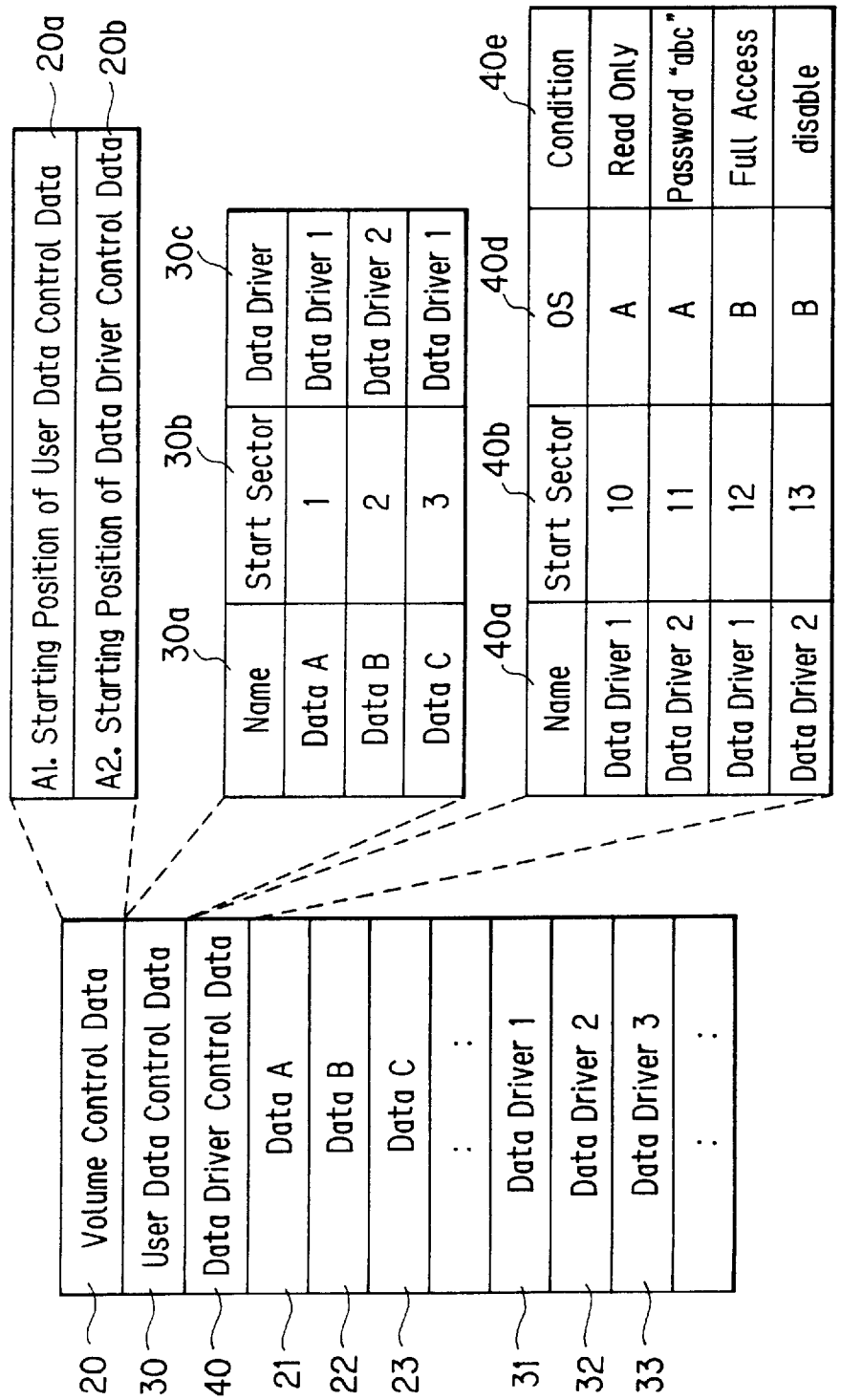
FIG. 14 is a diagram showing the structure of data on an interchangeable storage medium according to a third embodiment of the invention.

FIG. 14 is a diagram for describing the structure of data on an interchangeable storage medium according to a third embodiment of the invention. The difference between this embodiment and the first embodiment is that the data driver control information 40 includes, for each data driver, (4) a condition 40$e$ for limiting the environment of utilization and the users of a data file stored on an interchangeable storage medium 1 in addition to (1) the data driver name (Data Driver 1~Data Driver 3) 40$a$, (2) the data driver starting position (data driver starting sector) 40$b$ and (3) the name 40$d$ of the operating system capable of using the data driver. The condition 40$e$ specifies (1) whether the operating system is capable of reading and writing a data file unconditionally using a data driver, and (2) utilization condition for enabling reading and writing. The utilization condition is described using the type of operating system, the type and size of data and user information. It is possible to describe a utilization condition by one or a combination of these items of information. The conditions may be fixed at all times. Alternatively, the user may be prompted to enter data such as a password and this may be used as the condition. Further, these conditions need not be made the same at the time of reading and writing. In addition, the conditions may be made the same on the entire interchangeable storage medium or they may be specified in data file units.

In FIG. 14, the data file Data File A which uses "Data Driver 1" can be accessed for read only in the operating system OS/A but can be read and written in operating system OS/B. The data file Data B which uses the "Data Driver 2" requires entry of a password in the operating system OS/A and can be accessed in this operating system only if the password "abc" is entered. However, this data file unconditionally inaccessible in operating system OS/B.

(b) Data file read processing

Figure 15:
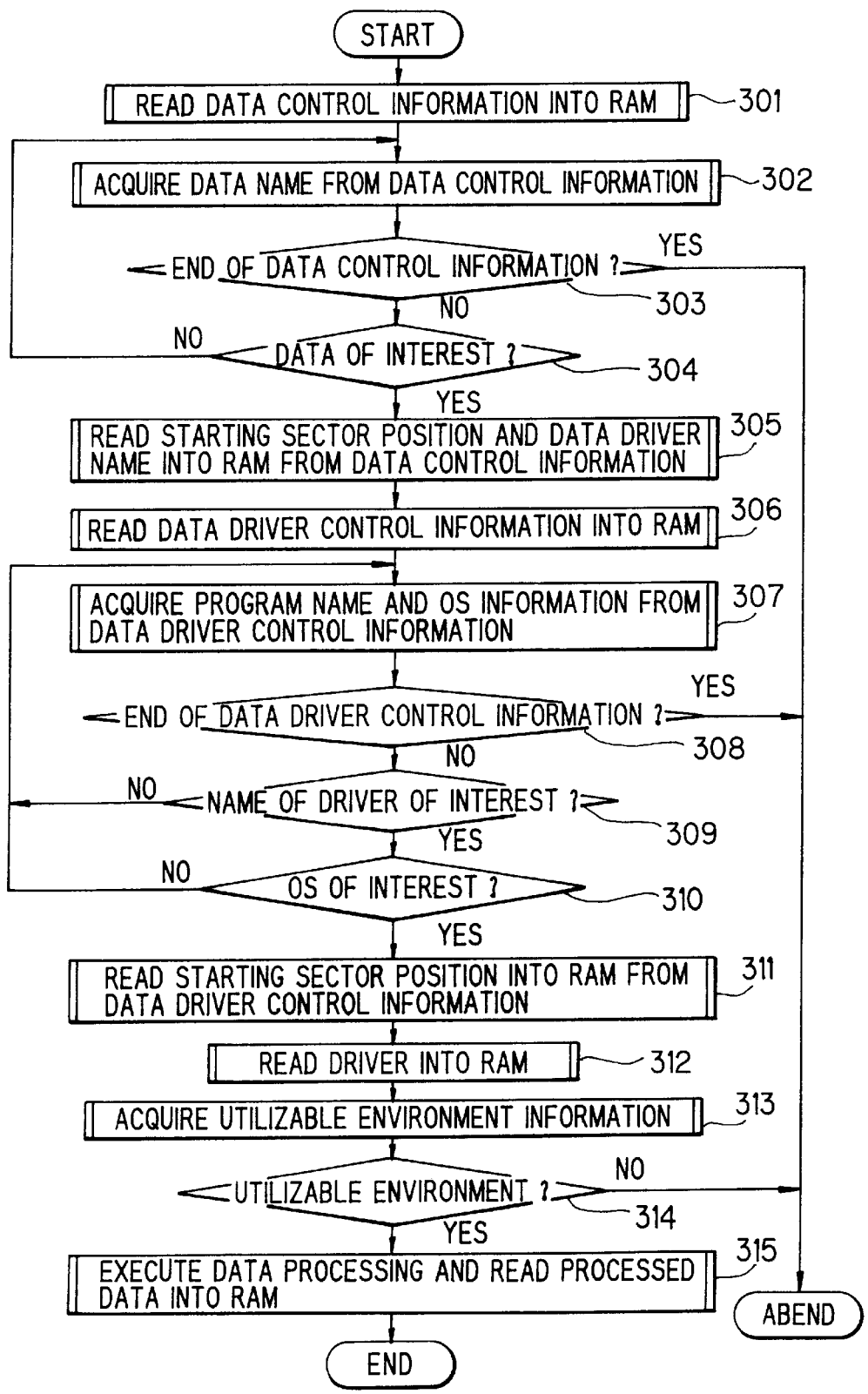
FIG. 15 is a flowchart of processing for reading in a data file according to the third embodiment.

FIG. 15 is a flowchart of processing for reading in a data file according to the third embodiment.

When a command for reading a prescribed data file is issued, the CPU 3a reads the user data control information 30 into the RAM 3c (step 301). Next, from the user data control information 30, the CPU 3a obtains the file name (data name) that coincides with the file name (data name) specified by the read command (steps 302~304). If the file name specified by the read command does not exist in the user data control information 30, the CPU 3a terminates processing (abnormal end: abend).

On the other hand, if the above-mentioned file name does exist in the user data control information 30, then the CPU 3a acquires the data file starting position and data driver name corresponding to this file name (step 305). The CPU 3a then reads the data driver control information 40 into the RAM 3c (step 306) and acquires from this information the data driver control information of the data driver which has the data driver name found at step 305 and which is executable by its own operating system (steps 307~310). The CPU 3a then executes read processing from step 311 onward.

On the other hand, if the data driver which has the data driver name found at step 305 and which is executable (usable) by its own operating system does note exist, processing is terminated (abnormal end: abend).

Following the execution of step 310, the CPU 3a acquires the recording starting position of the data driver and stores this position in the RAM 3c (step 311). The CPU 3a subsequently reads the data driver into the RAM 3c from the above-mentioned starting position (step 312).

If reading of the data driver is finished, the CPU 3a acquires the reading condition (the condition relating to the environment in which the data file is utilizable) 40e from the data driver control information 40 (step 313) and determines whether the reading condition is satisfied (step 314). The CPU 3a terminates processing (abend) if the reading condition is not satisfied. If the reading condition is satisfied, the CPU 3a reads the data file into the RAM 3c from the starting position obtained at step 305 and subjects the data file to prescribed processing by the read data driver in such a manner that the data file will by utilizable by a computer system (step 315).

If the condition for utilization is "read only" or "full access" at step 313, the CPU 3a allows the data file to be read in unconditionally. If the condition is "disable", the CPU 3a inhibits reading of the data file unconditionally. If the condition is "password abc", the CPU 3a causes a display screen to display a message prompting entry of a password and allows the data file to be read in only if the password "abc" is entered.

(c) Data file write processing

Figure 16:
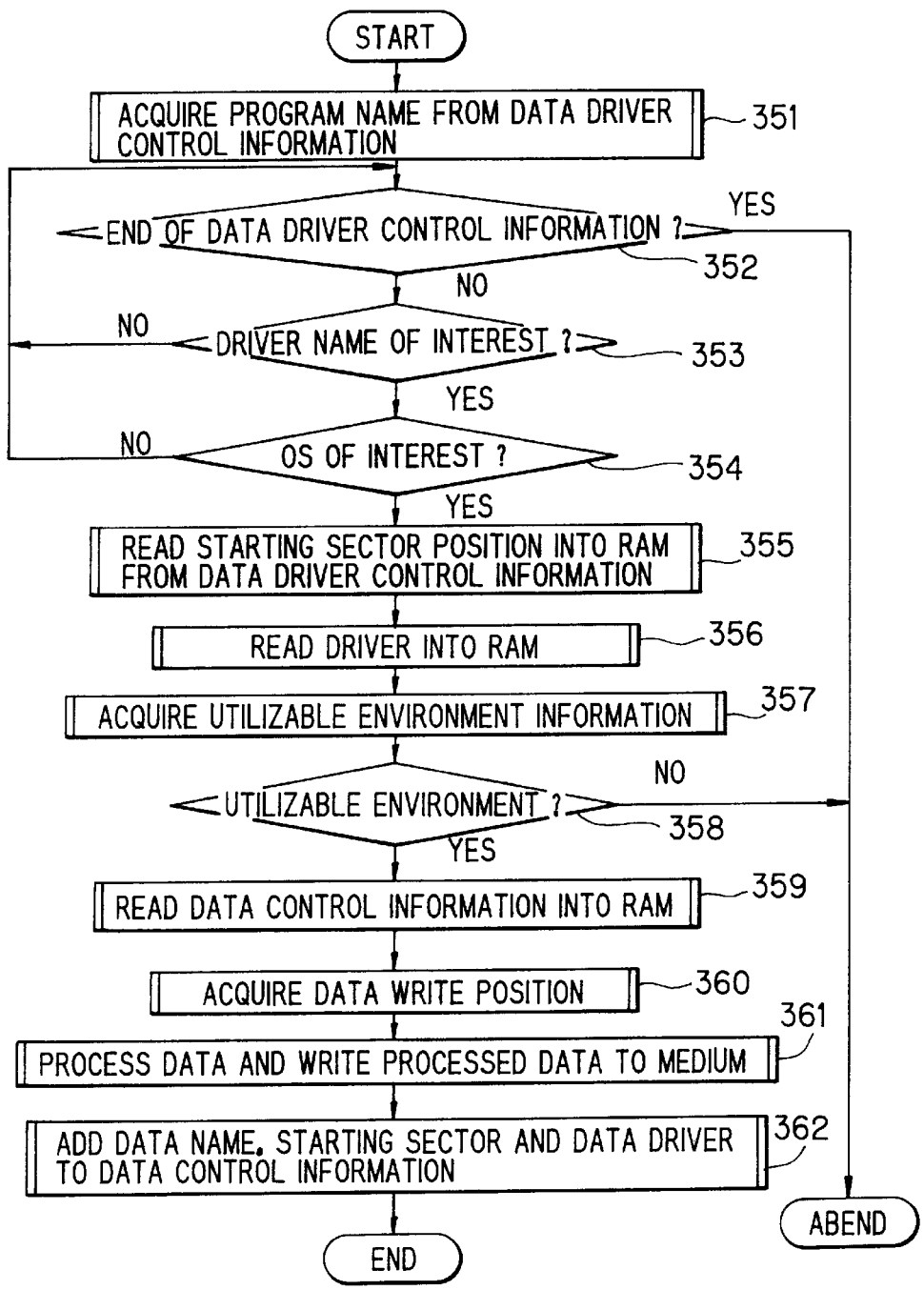
FIG. 16 is a flowchart of processing for writing a data file according to the third embodiment.

FIG. 16 is a flowchart of write processing according to the third embodiment. This is for a case where the user selects the data driver.

At the start of data-file write, the user enters a data driver name or information specifying a data driver corresponding thereto. For example, by issuing a command "Set Data Driver=Driver 1" from an input device such as the keyboard, the data driver can be clearly specified. After entry of this command, the CPU 3a determines whether the data driver which has the specified data driver name and which is usable by its own operating system exists in the data driver control information 40 (steps 351~354). If the data driver exists, then the CPU 3a executes write processing from step 355 onward. On the other hand, if the specified data driver does not exist in the data driver control information 40, then processing is ended (abnormal end: abend).

If the data driver exists, then the CPU 3a acquires the recording starting position of the specified data driver from the data driver control information 40 and stores it in the RAM 3c (step 355). The CPU 3a thenceforth reads the data driver from this starting position into the RAM 3c (step 356), acquires the writing condition (the condition relating to the environment in which the data file is utilizable) 40e from the data driver control information 40 (step 357) and determines whether the writing condition is satisfied (step 358).

The CPU 3a terminates processing (abend) if the writing condition is not satisfied. If the writing condition is satisfied, the CPU 3a reads in the user data control information 30 from the interchangeable storage medium 1 (step 359) and acquires the position at which the data file is to be recorded (step 360). The CPU 3a thenceforth subjects the data file to be written to prescribed processing using the data driver read in at step 356 and writes the data file thus processed at the recording position obtained at step 360 (step 361). Finally, the CPU 3a produces data control information indicating the corresponding relationship among the file name of the data file, the name of the data driver and the position at which the data file is written and writes this information to the interchangeable storage medium (step 362).

If the condition for utilization is "full access" at step 358, the CPU 3a allows the data file to be written unconditionally. If the condition is "read only" or "disable", the CPU 3a inhibits writing of the data file unconditionally. If the condition is "password abc", the CPU 3a causes a display screen to display a message prompting entry of a password and allows the data file to be written only if the password "abc" is entered.

Thus, a function for limiting the environment of utilization is implemented by the data driver. Accordingly, "full access" can be given in a data file authoring environment, for instance, and "Read Only" can be allowed in a user utilization environment, so that only a user who satisfies the conditions of utilization can use a data file. This makes it possible to provide broad utilization while protecting the rights to data.

(d) Modification of third embodiment

The foregoing relates to a case where utilization conditions (data file access conditions) are added onto the data driver control information 40 and the reading/writing of a data file is enabled or disabled based upon the utilization conditions. However, it is also possible to provide a data driver with a function for managing access of users to a data file.

Figure 17:
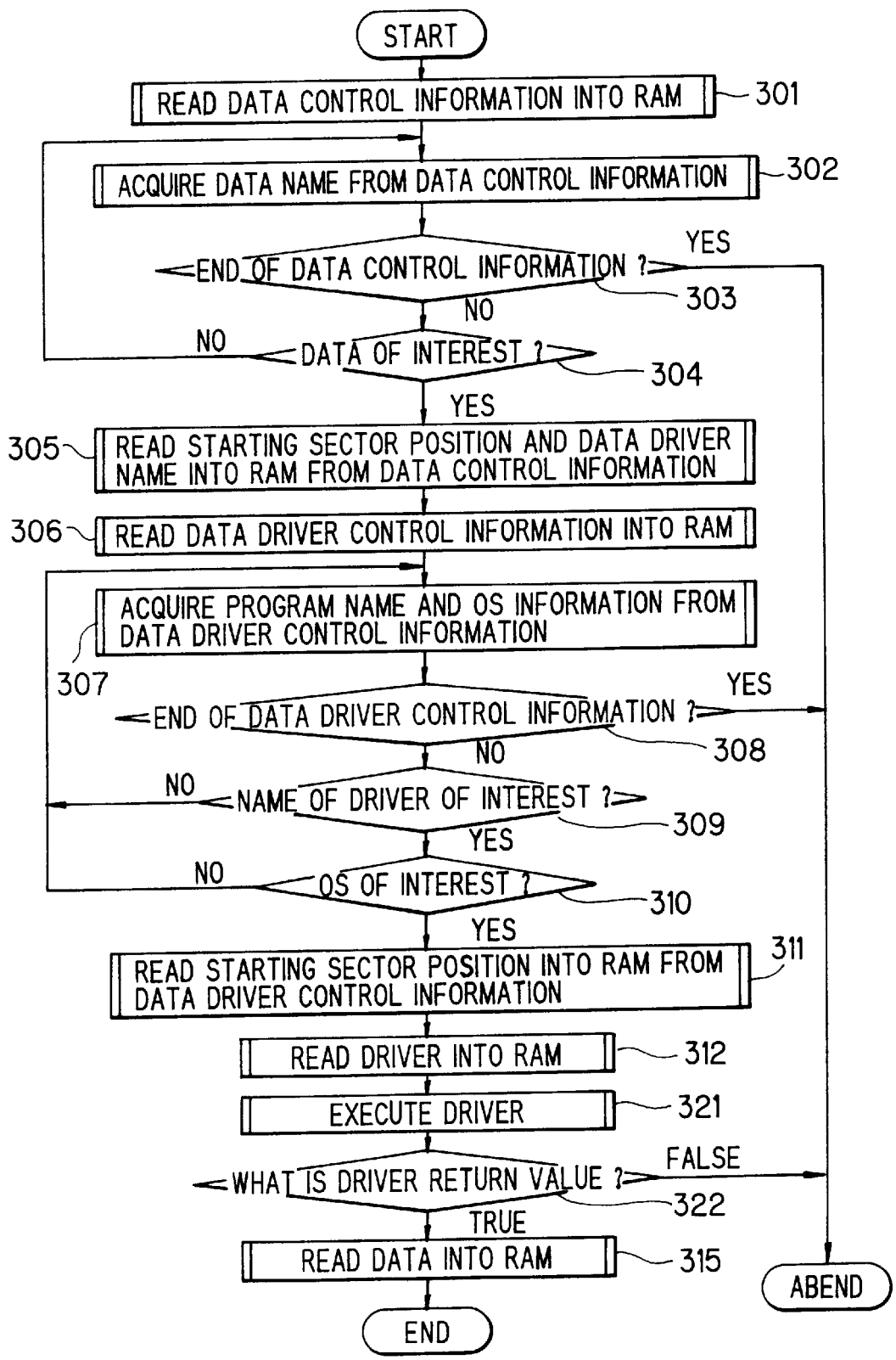
FIG. 17 is a flowchart of other processing for reading in a data file according to the third embodiment.

FIG. 17 is a flowchart of read processing in such case. Steps identical with those in the processing flowchart of FIG. 15 are designated by like step numbers. It should be noted that the data driver here merely manages access to a data file and does not subject the data file to processing such as conversion.

The processing in FIG. 17 that differs from that of FIG. 15 is the processing following step 312, at which the data file is read into the RAM 3c. When the data file is read in, the CPU 3a executes this data driver immediately (step 321) and determines, based upon the results of executing the data driver, whether the ensuing processing for reading in the data file is to be continued or not (step 322). If the return value obtained by execution of the data driver is "FALSE", the CPU 3a terminates processing (abend). If the return value is "TRUE", the CPU 3a reads in the data file from the starting position obtained at step 305 (step 315).

Figure 18:
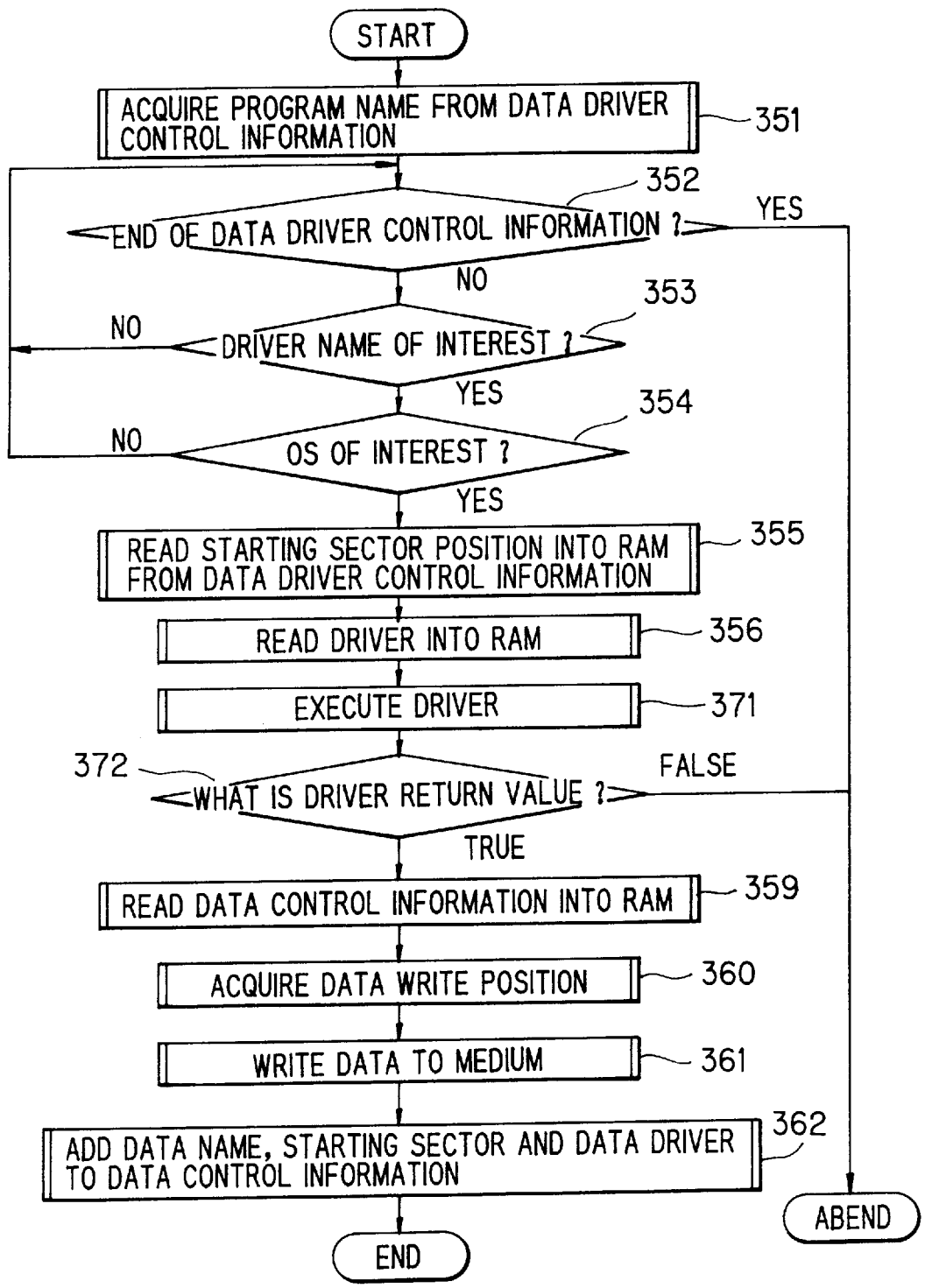
FIG. 18 is a flowchart of other processing for writing a data file according to the third embodiment.

FIG. 18 is a flowchart of write processing. Steps identical with those in the processing flowchart of FIG. 16 are designated by like step numbers. It should be noted that the data driver here merely manages access to a data file and does not subject the data file to processing such as conversion.

The processing in FIG. 18 that differs from that of FIG. 16 is the processing following step 356, at which the data driver is read into the RAM 3c. When the data driver is read in, the CPU 3a executes this data driver immediately (step 371) and determines, based upon the results of executing the data driver, whether the ensuing processing for writing the data file is to be continued or not (step 372). If the return value obtained by execution of the data driver is "FALSE", the CPU 3a terminates processing (abend). If the return value is "TRUE", the CPU 3a reads in user data control information 30 from the interchangeable storage medium 1 (step 359) and acquires the position at which the data file is to be recorded (step 360). The CPU 3a then writes the data file of interest at the recording position obtained at step 360 (step 361). Finally, the CPU 3a produces data control information indicating the corresponding relationship among the file name of the data file, the name of the data driver and the position at which the data file is written and writes this information to the interchangeable storage medium (step 362).

Figure 19:
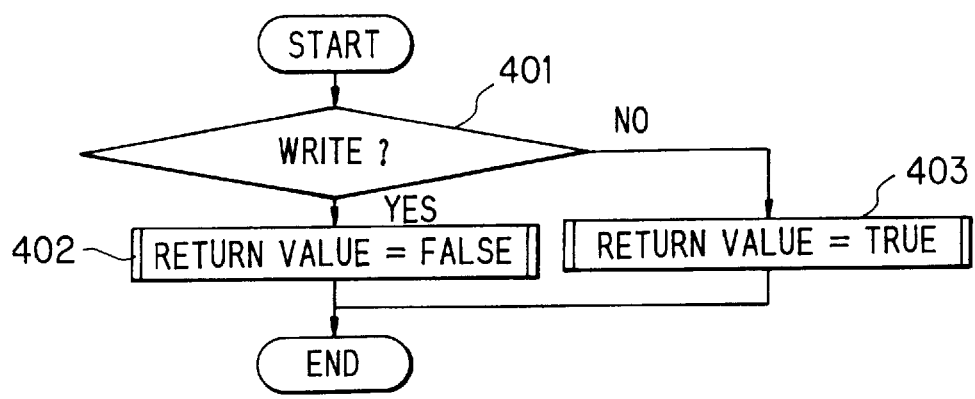
FIG. 19 is a flowchart of processing by a data driver Data Driver 1 for an operating system OS/A.
Figure 20:
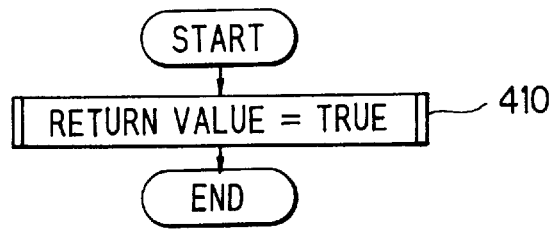
FIG. 20 is a flowchart of processing by a data driver Data Driver 1 for an operating system OS/B.
Figure 21:
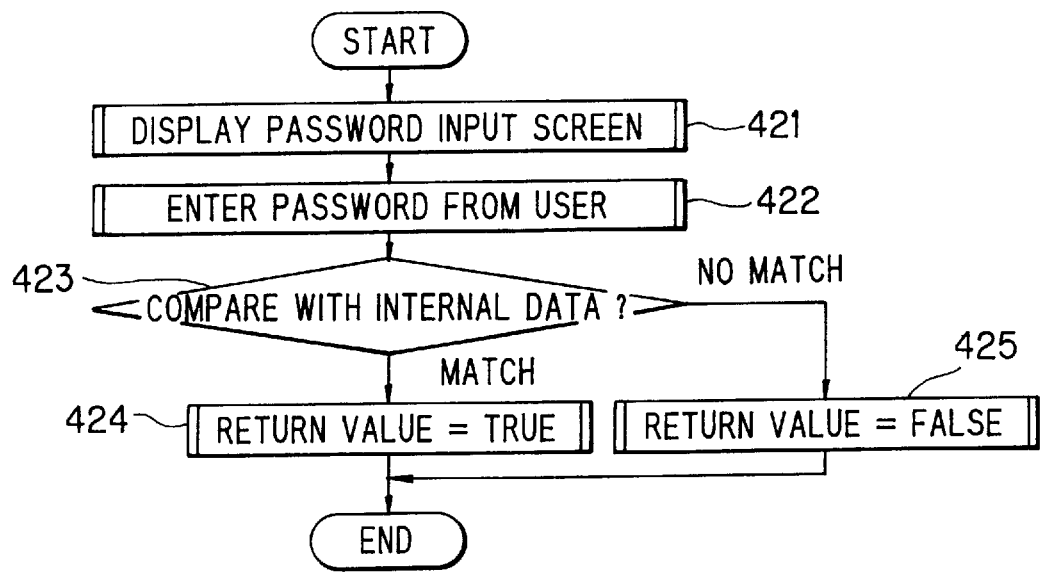
FIG. 21 is a flowchart of processing by a data driver Data Driver 2 for an operating system OS/A.
Figure 22:
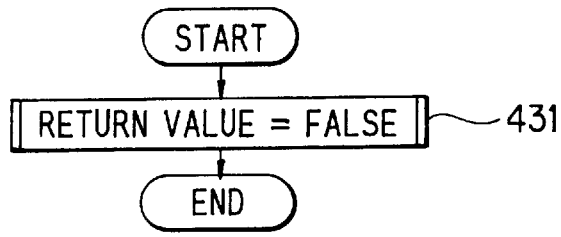
FIG. 22 is a flowchart of processing by a data driver Data Driver 2 for an operating system OS/B.

FIG. 19 is a flowchart of processing by the data driver Data Driver 1 for the operating system OS/A, FIG. 20 is a flowchart of processing by the data driver Data Driver 1 for the operating system OS/B, FIG. 21 is a flowchart of processing by the data driver Data Driver 2 for the operating system OS/A, and FIG. 22 is a flowchart of processing by the data driver Data Driver 2 for the operating system OS/b.

As shown in FIG. 19, the Data Driver 1 for the operating system OS/A for stipulating the access conditions of the data file Data A determines whether writing is to be performed (step 401), makes the return value "FALSE" in case of writing (step 402) and makes the return value "TRUE" in case of reading (step 403). As a result, in a case where a computer system having the operating system OS/A reads in the data file Data A, the return value becomes "TRUE" at step 322 (FIG. 17) and reading of the data file Data A becomes possible. However, in a case where the data file Data A is to be written, the return value becomes "FALSE" at step 372 (FIG. 18) and writing of the data file Data A is disabled. On the other hand, as shown in FIG. 20, the Data Driver 1 for the operating system OS/B for stipulating the access conditions of the data file Data A makes the return value "TRUE" at all times irrespective of read/write (step 410). As a result, a computer system having the operating system OS/B enables the data file Data A to be read/written freely.

Further, as shown in FIG. 21, the Data Driver 2 for the operating system OS/A for stipulating the access conditions of the data file Data B displays a password input screen (step 421), compares a password entered by the user with a set password (steps 422, 423), makes the return value "TRUE" (step 424) when the correct password has been entered and makes the return value "FALSE" (step 425) when the correct password has not been entered. As a result, in a case where a computer system having the operating system OS/A reads or writes the data file Data B, the return value is made "TRUE" at step 322 (FIG. 17) and at step 372 (FIG. 18) if a password that matches the set password has been entered. Reading and writing of the data file Data B are then enabled. However, if the correct password is not entered, the return value becomes "FALSE" at steps 322 and 372 and reading/writing of the data file Data B is disabled. On the other hand, as shown in FIG. 22, the Data Driver 2 for the operating system OS/B for stipulating the access conditions of the data file Data B makes the return value "FALSE" at all times irrespective of read/write (step 431). As a result, a computer system having the operating system OS/B makes it impossible for the data file Data B to be read/written.

Thus, in accordance with the third embodiment, restriction on utilization of a data file can be made in dependence upon the data utilization environment, namely in dependence upon the operating system and user. For example, changing the operating system at the time of editing and the operating system at the time of utilization by a user makes it impossible for the user to rewrite a data file. This also facilitates control for preventing a user from seeing the content of a data file.

(E) Fourth embodiment

In accordance with a fourth embodiment of the invention, a data file is read/written using a retrieval keyword instead of a file name. The embodiment is implementing by a configuration identical with that of the first embodiment shown in FIG. 2.

The structure of the data stored on the interchangeable storage medium in the fourth embodiment is substantially the same as that of the second embodiment shown in FIG. 8. The difference is that the user data control information 30 is provided with retrieval keywords 30d-1, 30d-2, . . . , as shown in FIG. 23. More specifically, the user data control information 30 includes, for each data file, (4) retrieval keywords 30d-1, 30d-2, . . . , which are used to retrieve data files, in addition to (1) the file name 30a, (2) the name 30c of a data driver for subjecting the data file to predetermined processing so that the data file can be utilized by a computer system and (3) the relationship to location 30b of the data file.

Figure 24:
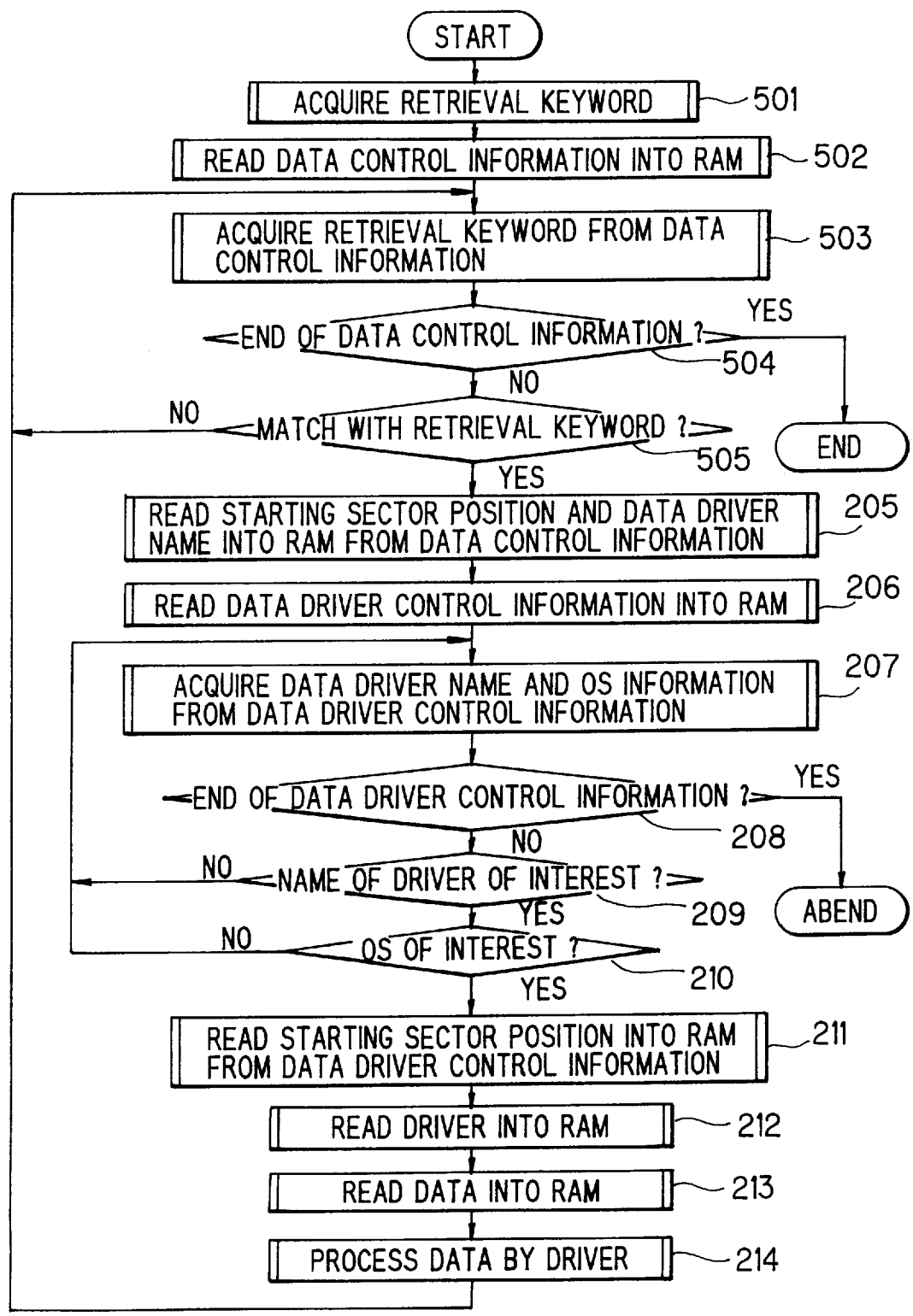
FIG. 24 is a flowchart of processing for reading in a data file according to the fourth embodiment.

FIG. 24 is a flowchart of processing for reading in a data file according to the fourth embodiment. Steps identical with those of the processing flowchart of FIG. 9 are designated by like step numbers.

When a data file is to be read in, a retrieval keyword relating to the data file desired to be read is entered together with a read command (step 501). When the read command is generated, the CPU 3a reads the user data control information 30 into the RAM 3c (step 502). Next, from the user data control information 30, the CPU 3a extracts the keyword (step 503) and obtains user data control information having the keyword that matches the retrieval keyword specified by the read command (steps 504, 505). If the user data control information having a keyword that matches the retrieval keyword specified by the read command does not exist, the CPU 3a terminates processing (abnormal end:

abend). If the user data control information does exist, then the CPU 3a reads the data file starting position and data driver name from the user data control information and stores these in the RAM 3c (step 205). Processing similar to that of the second embodiment is then executed to read in the data file.

A plurality of keywords may be provided for one data file and the same keyword may be provided repeatedly for data files. For example, when the keyword "mouse" is entered in the case of FIG. 23, only the data file Data C is written in memory. However, when the keyword "car" is entered, data file Data A and data file Data B are written in memory.

Figure 25:
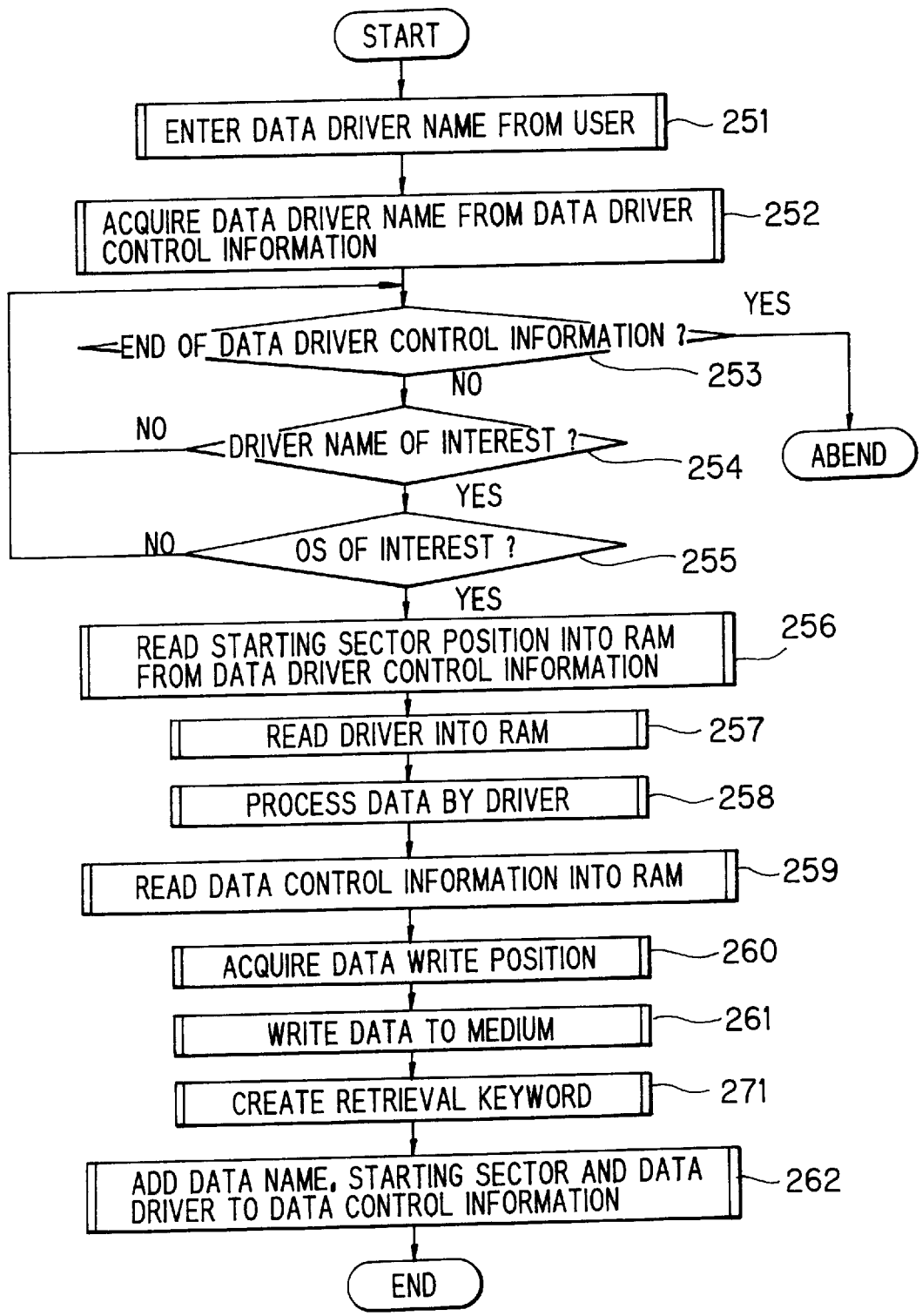
FIG. 25 is a flowchart of processing for writing a data file according to the fourth embodiment.

FIG. 25 is a flowchart of processing for writing a data file according to the fourth embodiment. Steps identical with those of the processing flowchart of FIG. 10 are designated by like step numbers. The processing from step 251 to step 261 is the same as the write processing of the second embodiment.

When the writing of a data file on the interchangeable storage medium at step 261 is finished, the CPU 3a allows the user to enter a data file retrieval keyword or creates a retrieval keyword automatically (step 271). The CPU 3a thenceforth creates user data control information having the name of a data file to be written, the name of a program for subjecting this data file to processing, the data file storage position and the retrieval keyword, and records this information on the storage medium (step 262).

Figure 26:
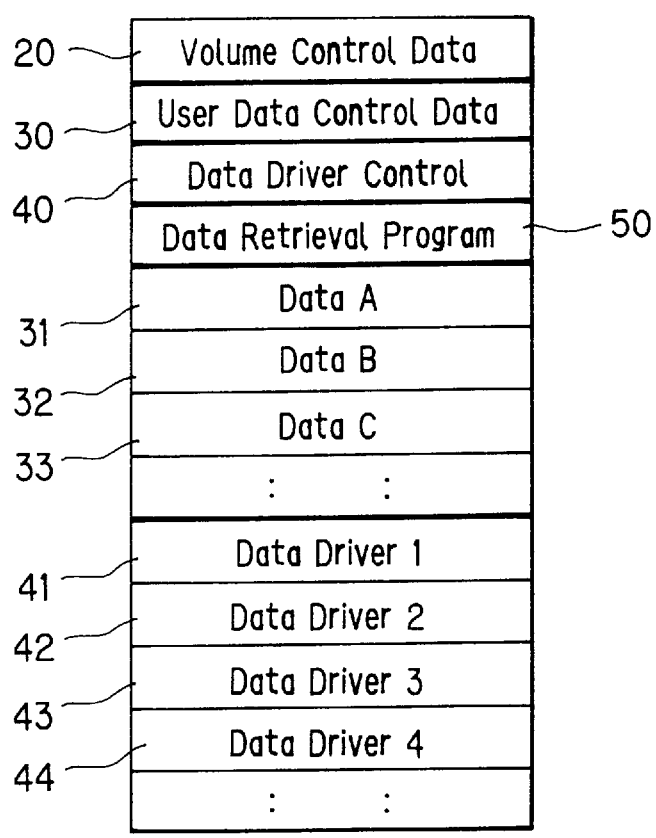
FIG. 26 is a data organization diagram showing the organization of data on an interchangeable storage medium having a data file search program.

The retrieval keyword is described as being a character string above. However, so long as a data file can be specified, the retrieval keyword need not necessarily be character data. Further, in case of character data, retrieval may be performed under a condition not of a perfect match with the keyword but of a match with the front half, a match with the rear half or other partial match. Furthermore, to create a retrieval keyword automatically, a method disclosed in the specification of Japanese Patent Publication No. H07-113926 may be employed. Further, the retrieval means may be recorded in the computer system and a set method may be used at all times. However, an arrangement may be adopted in which a data retrieval program 50 is recorded on the interchangeable storage medium 1, in a manner similar to that of data drivers, as shown in FIG. 26, and retrieval is performed using this data retrieval program.

In accordance with this embodiment, it is possible to select data and a data driver easily by entering a retrieval keyword.

(F) Fifth embodiment

According to a fifth embodiment of the invention, a data file is recorded on the interchangeable storage medium 1 in data size units and in a data layout suited to the data file or medium without cluster length and the placement (layout) thereof being fixed by the drive. In addition, a data driver is used so as to read in the data file. The fifth embodiment can be implemented by a configuration identical with that of the system of the first embodiment shown in FIG. 2.

(a) Data structure on recording medium

Figure 27:
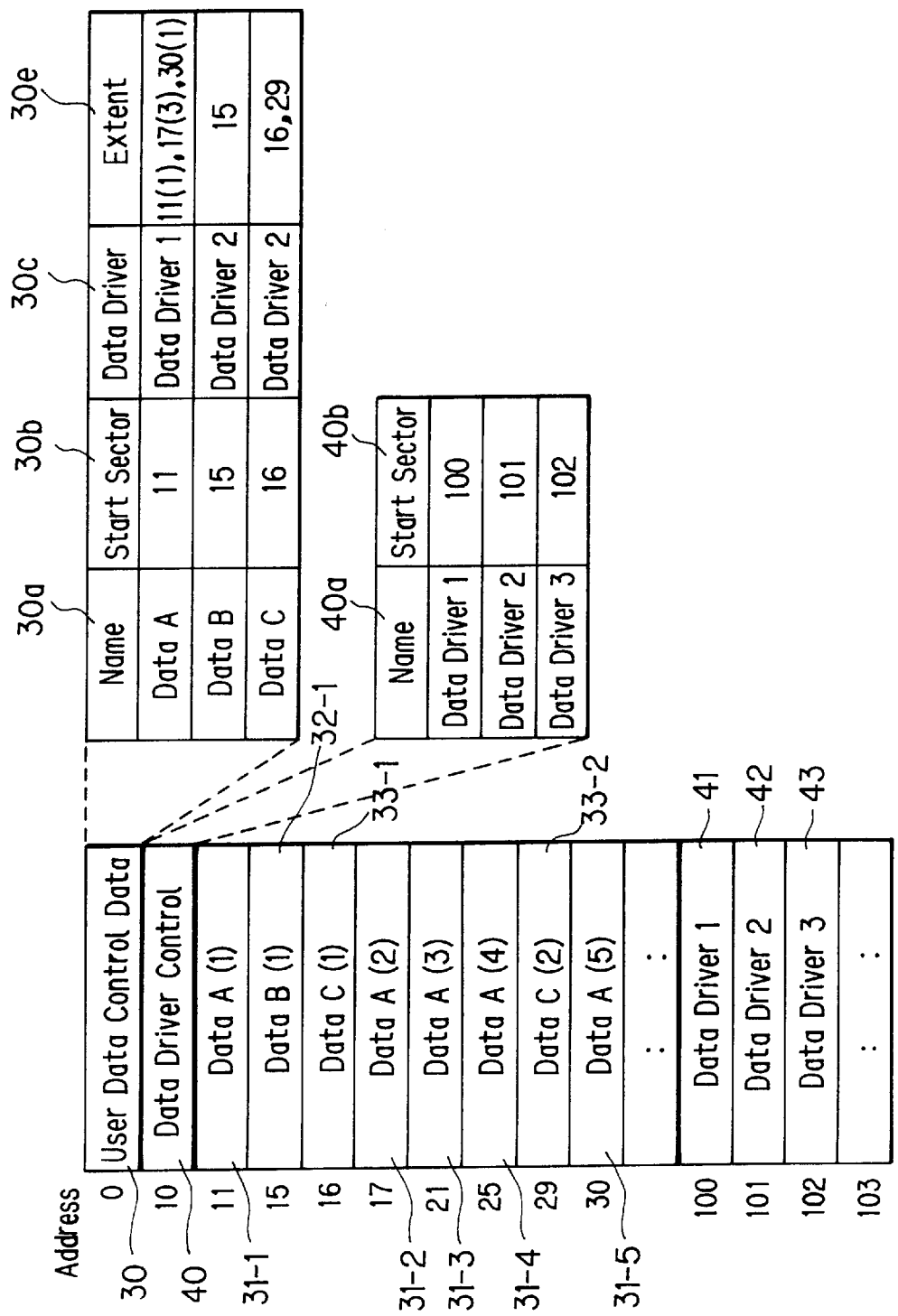
FIG. 27 is a diagram showing the structure of data on an interchangeable storage medium according to a fifth embodiment of the invention.

FIG. 27 is a diagram for describing the structure of data on an interchangeable storage medium according to the fifth embodiment of the invention. User data control information 30, data driver control information 40, data files (Data A~Data C) 31-1~31-5, 32-1, 33-1~33-2, and data drivers (Data Driver 1~Data Driver 3) 41~43, which are for stipulating the cluster length of a data file and the placement (layout) thereof have been stored on the interchangeable storage medium.

The data file Data A is stored in cluster units (one cluster consists of four sectors) at sector addresses 11, 17, 21, 25, 30, the data file Data B is stored in cluster units (one cluster consists of one sector) at a sector address 15, and the data file Data C is stored in cluster units (one cluster consists of one sector) at sector addresses 16, 29.

The user data control information 30 indicates, for each data file, the corresponding relationship among (1) the file name (Data A~Data C) 30a, (2) the starting position of the data file (the position of the file starting sector) 30b, (3) the name (Data Driver 1~Data Driver 3) 30c of a data driver for deciding the cluster size or layout of the data file, and (4) data layout information 30e in cluster units of the data file. The data file Data A has been stored in the form of one cluster from sector address 11, three clusters from sector address 17 and one cluster from sector address 30. Therefore, 11(1), 17(3) and 30(1) (where the numerical value inside the parentheses represents the number of continuous clusters) are recorded as the data layout information 30e. In other words, in the case of the data file Data A, which has a large data size, four sectors are dealt with as one cluster and the data layout information 30e is represented in the form of "starting sector address (continuous length)", thereby it is possible to read out the data file continuously and efficiently. By contrast, in the case of the data files Data B and Data C, which have a small data size, one sector is made one cluster, whereby the data are managed by a method exhibiting good space efficiency.

The data driver control information 40 includes, for each data driver, (1) the data driver name (Data Driver 1~Data Driver 3) 40a and (2) the data driver starting position (data driver starting sector) 40b.

(b) Read processing according to the fifth embodiment

Figure 28:
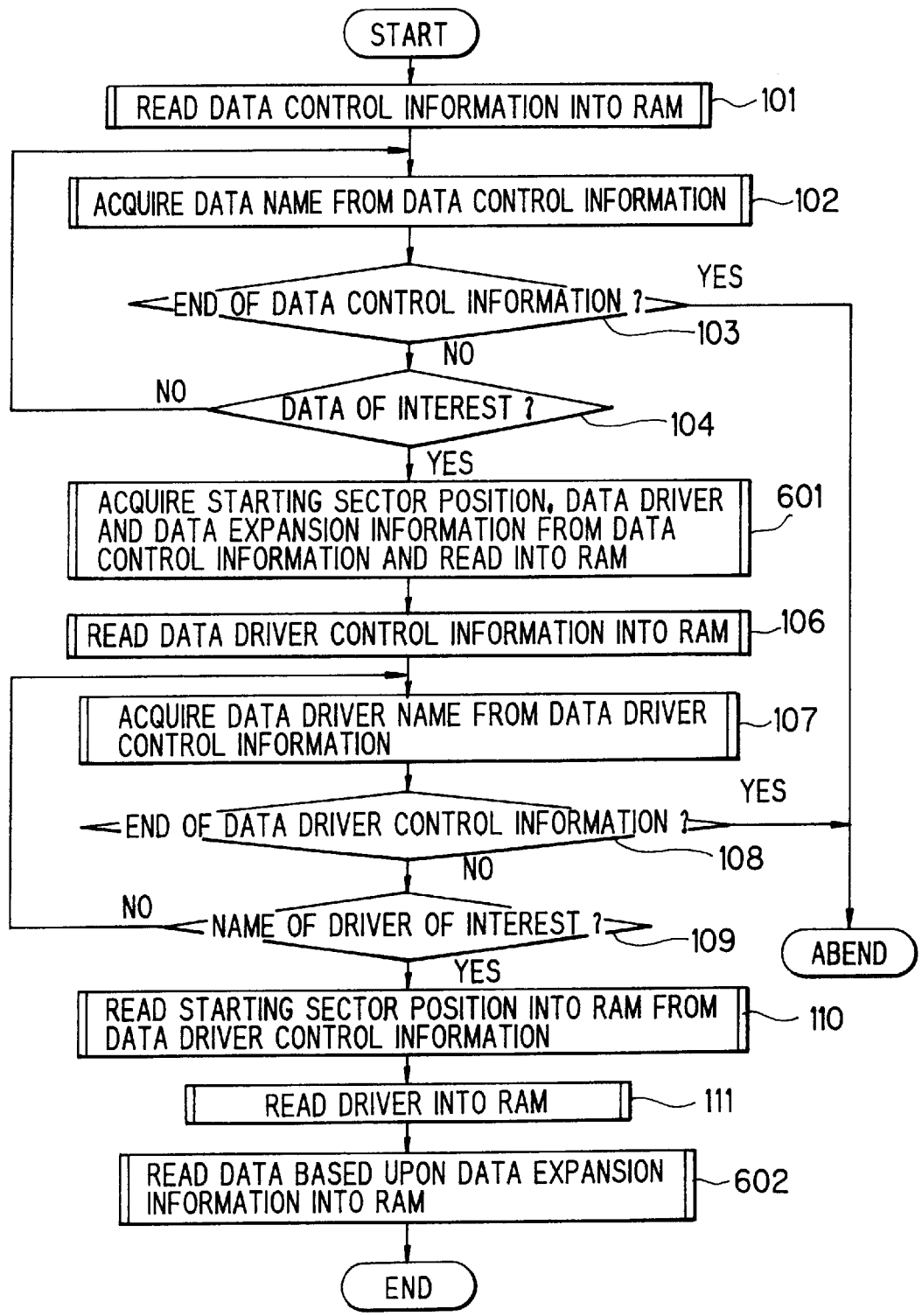
FIG. 28 is a flowchart of processing for reading in a data file according to the fifth embodiment.

FIG. 28 is a flowchart of processing for reading in a data file according to the fifth embodiment. Steps identical with those of the read processing of the first embodiment shown in FIG. 4 are designated by like step numbers. Here a data driver decides cluster length or data layout and reads out a data file based upon the cluster length or data layout. The data driver does not subject the data file to conversion or other processing.

When a command for reading in a prescribe data file is generated, the CPU 3a reads the user data control information 30 into the RAM 3c (step 101). Next, from the user data control information 30, the CPU 3a obtains the file name (data name) that coincides with the file name specified by the read command (steps 102~104). If the file name specified by the read command does not exist in the user data control information 30, the CPU 3a terminates processing (abnormal end: abend).

On the other hand, if the above-mentioned file name does exist in the user data control information 30, then the CPU 3a acquires the data file starting position, the data driver name and data expansion information (data layout information) that have been stored in correspondence with this file name (step 601). For example, assume a case where the data file Data A is read in. If the data control information shown in FIG. 27 has been recorded on the interchangeable storage medium 1, then "11" is acquired as the starting sector position, "Data Driver 1" is acquired as the data driver name and 11(1), 17(3), 30(1) are acquired as the data layout information. The CPU 3a subsequently reads the data driver control information 40 into the RAM 3c (step 106) and acquires the data driver control information having the data driver name found at step 601 from the data driver control information 40 (steps 107~109).

If the data driver found at step 601 does not exist in the data driver control information 40, this means that the data driver has not been recorded on the interchangeable storage medium 1; hence, the CPU 3a terminates processing (abnormal end: abend).

On the other hand, if the data driver name obtained at step 601 does exist in the data driver control information 40, then the CPU 3a acquires the recording starting position of the data driver and stores this position in the RAM 3c (step 110). In the example of FIG. 27, the starting position "100" of "Data Driver 1" is acquired. The CPU 3a subsequently reads the data driver into the RAM 3c from the above-mentioned starting position (step 111). Thereafter, the CPU 3a reads the data file from the interchangeable storage medium 1 and stores it in the RAM 3c in accordance with data file starting position and data layout information obtained at step 601 using the above-mentioned data driver (step 602).

(c) Data file write processing

Figure 29:
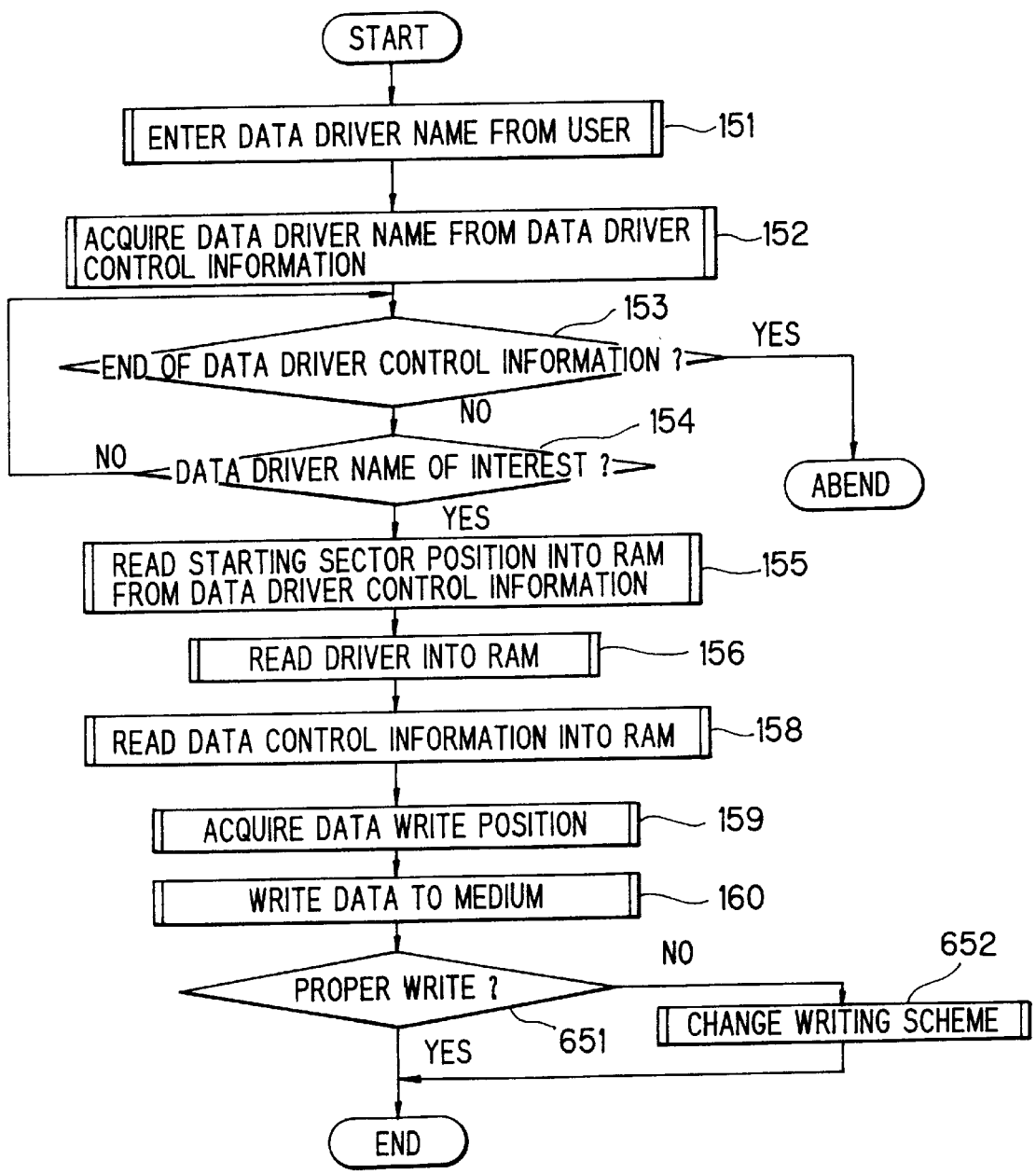
FIG. 29 is a flowchart of processing for writing a data file according to the fifth embodiment.

FIG. 29 is a flowchart of data file write processing according to the fifth embodiment. Steps identical with those of the write processing of the first embodiment shown in FIG. 5 are designated by like step numbers. Here a data driver decides cluster length or data layout and reads out a data file based upon the cluster length or data layout. The data driver does not subject the data file to conversion or other processing.

At the start of data-file write, the user enters a data driver name or information specifying a data driver corresponding thereto (step 151). For example, by issuing an instruction "Set Data Driver=Driver 1" from an input device such as the keyboard, the data driver can be specified.

When the above-mentioned command is entered, the CPU 3a determines whether the specified data driver exists in the data driver control information 40 (steps 152~154). If the data driver exists, then the CPU 3a executes write processing from step 155 onward. On the other hand, if the data driver specified by the command does not exist in the data driver control information 40, then this data driver is not present on the interchangeable storage medium 1 and processing is ended (abnormal end: abend).

If the data driver exists, then the CPU 3a acquires the recording starting position of the specified data driver from the data driver control information 40 and stores it in the RAM 3c (step 155). The CPU 3a thenceforth reads the data driver from this starting position into the RAM 3c (step 156), reads the user data control information 30 from the interchangeable storage medium 1 (step 158) and acquires the recording position of the data file from this user data control information.

The CPU 3a thenceforth uses the data driver to successively write the data file of interest from the recording position in cluster units of a predetermined length, produces data control information comprising the file name of the data file, the name of the data driver, the data write starting position and the data layout information, and writes this information to the interchangeable storage medium 1 (step 160).

After writing is completed, it is determined whether writing has been performed properly. If the recording scheme (e.g., cluster size) is found to be inappropriate, then the recording scheme (cluster size) is changed and the data layout information is rewritten. For example, in a case where a data file has been written using a large cluster size, the cluster size is reduced and the data layout information is rewritten if the file size of the actual data file is small. As a result, in accordance with the fifth embodiment, recording of data is possible in a format suited to the size of the data file. This makes it possible to write data in a format that provides good performance and space efficiency. Moreover, by preparing data drivers for a plurality of operating systems, data can readily be shared by the plurality of operating systems.

(G) Sixth Embodiment (a) Overview of sixth embodiment

The embodiment described above relates to a case where a single data driver for applying predetermined processing is used in association with a single data file. In actuality, however, a plurality of data drivers can be used in association with a single data file.

According to the sixth embodiment of the invention, a plurality of data drivers can be used for one data file. The system configuration is the same as that of the first embodiment shown in FIG. 2.

Figure 30:
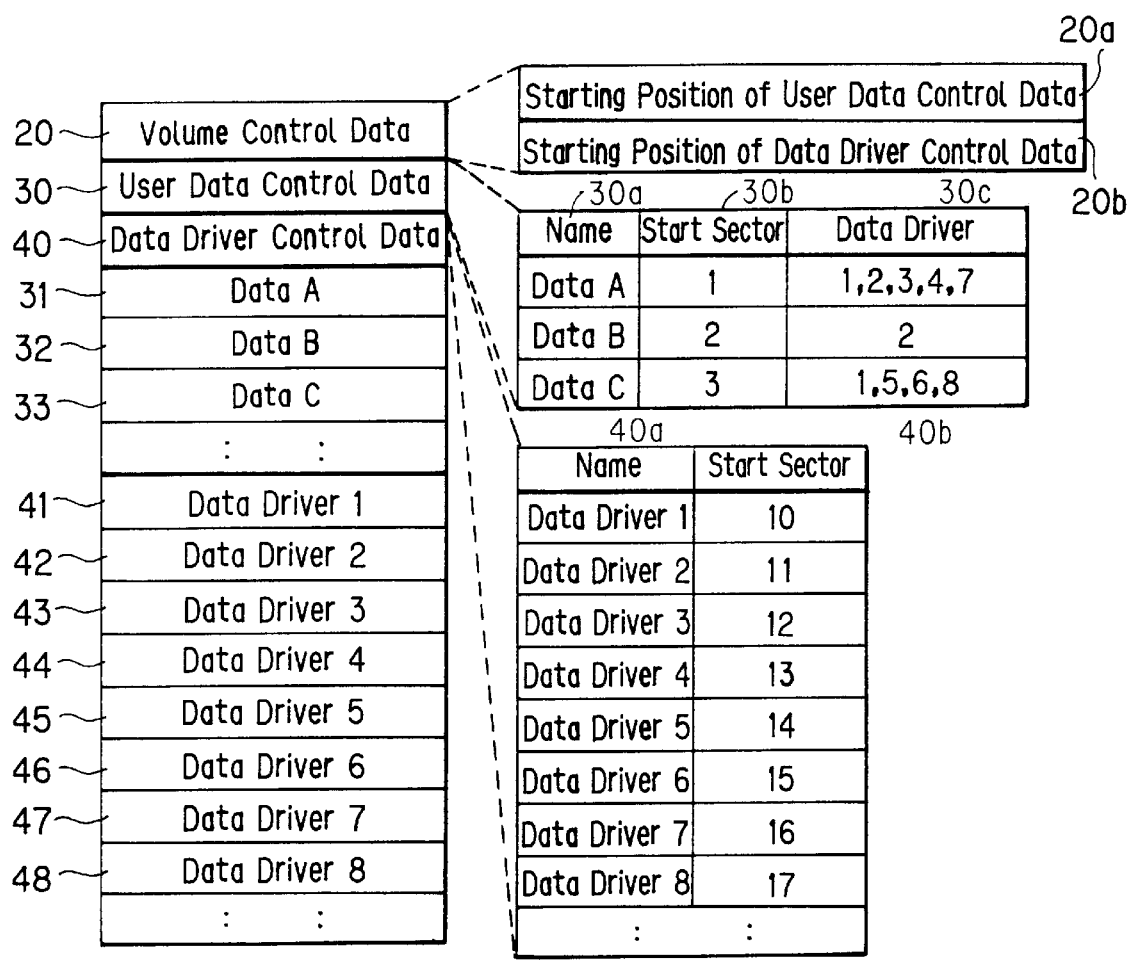
FIG. 30 is a diagram showing the structure of data on an interchangeable storage medium according to a sixth embodiment of the invention.

As shown in FIG. 30, the optical disk 1 serving as the interchangeable storage medium has a data storage structure substantially the same as that of the first embodiment shown in FIG. 3. This embodiment differs from the first embodiment in that a plurality of data drivers can be registered in the user data control information 30 in association with one data file.

When a computer system reads in a data file from the optical disk 1, a plurality of data drivers are read in successively and each of the data drivers is used to apply the data file to predetermined processing.

b) Data file read processing according to the sixth embodiment

Figure 31:
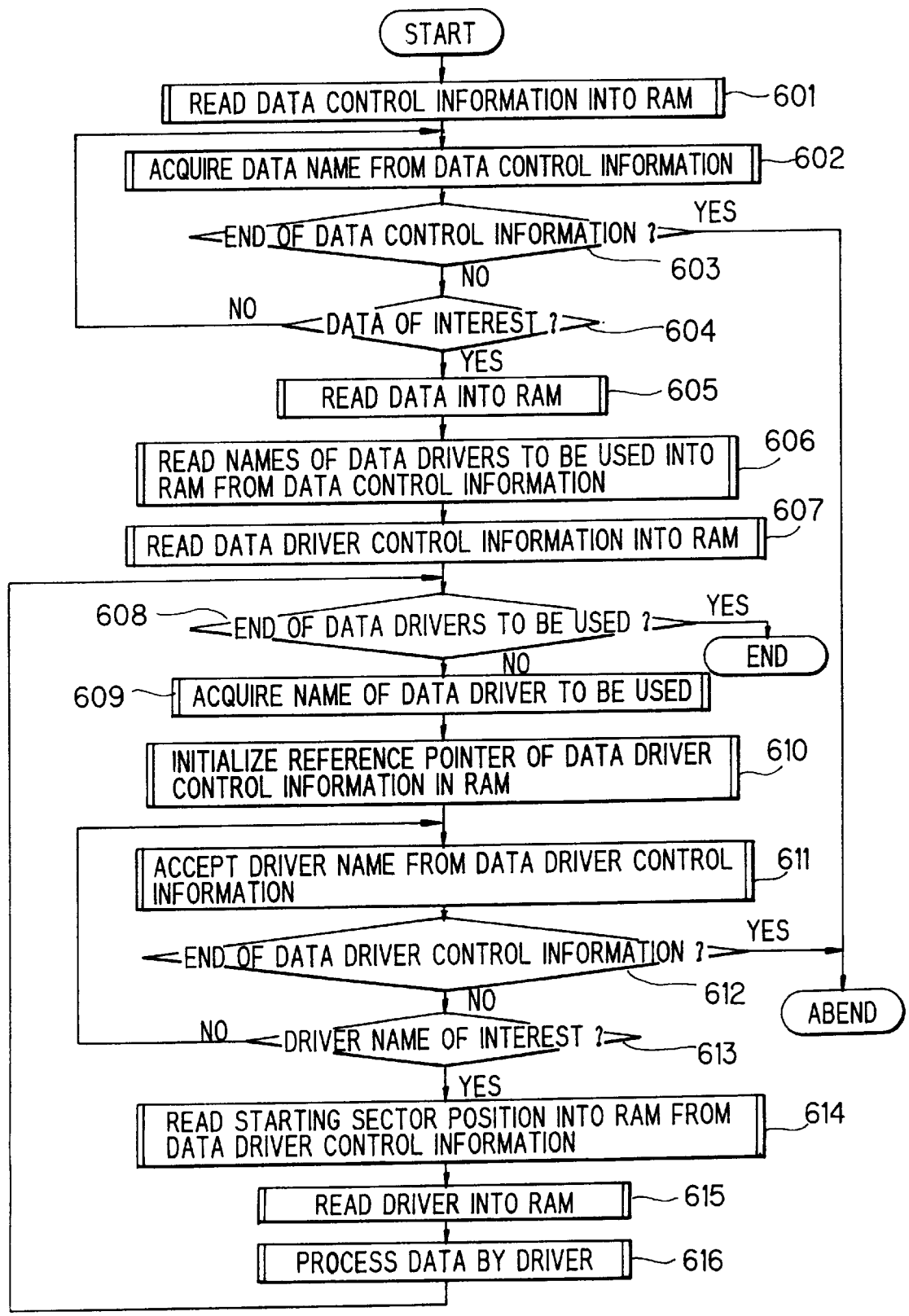
FIG. 31 is a flowchart (for reading) of processing according to the sixth embodiment.

FIG. 31 is a flowchart of processing for reading in a data file in accordance with a sixth embodiment.

When a command for reading a prescribed data file is issued, the CPU 3a reads the user data control information 30 into the RAM 3c (step 601). Next, from the user data control information 30, the CPU 3a obtains the file name (data name) that coincides with the file name specified by the read command (steps 602~604). If the file name specified by the read command does not exist in the user data control information 30, the CPU 3a terminates processing (abnormal end: abend).

On the other hand, if the above-mentioned file name does exist in the user data control information 30, then the CPU 3a acquires the data file starting position that have been stored in correspondence with this file name and writes this data file in the RAM 3c (step 605). Next, the CPU 3a reads the names of the group of stored data drivers used in association with the file name from the user data control information 30 to the RAM 3c (step 606). The CPU 3a then reads the data driver control information 40 into the RAM 3c (step 607).

The CPU 3a determines whether the reading of all data drivers of the group thereof and the processing of the data file by these data drivers have been executed (step 608). If all reading and processing have been completed, the CPU 3a terminates processing.

If there is a data driver that has not yet subjected the data file to processing, the CPU 3a extracts the names of the data drivers, which have been recorded in the data control information, in regular order (step 609) and determines whether a data driver name that matches these extracted data driver names is present in the data driver control information (steps 610~613). If a data driver to be used does not exist in the data driver control information, then the CPU 3a terminates processing (abnormal end: abend).

If the data driver name does exist in the data driver control information, then the CPU 3a acquires the recording starting position of the data driver and reads this position into the RAM 3c (steps 614–615). Next, the CPU 3a uses the data driver than has been read and subjects the data file to the predetermined processing (step 616).

The CPU 3a thenceforth executes the processing from step 608 onward and repeats processing for the next specified data driver contained in the data control information.

Thus, when the user data control information 30 and data driver control information 40 has been recorded on the interchangeable storage medium 1 in the manner shown in FIG. 30 and the data file Data A is to be read in, "Data Drivers 1, 2, 3, 4, 7" are obtained from the user data control information 30 as the data drivers which will subject the data file Data A to processing. Accordingly, data driver "1" is read in first and subjects Data A to processing, then data driver "2" is read in and used to process Data, then data driver "3" and so on until all data drivers have been read in successively and used to subject the Data A to predetermined processing.

(c) Data file read processing according to the sixth embodiment

Figure 32:
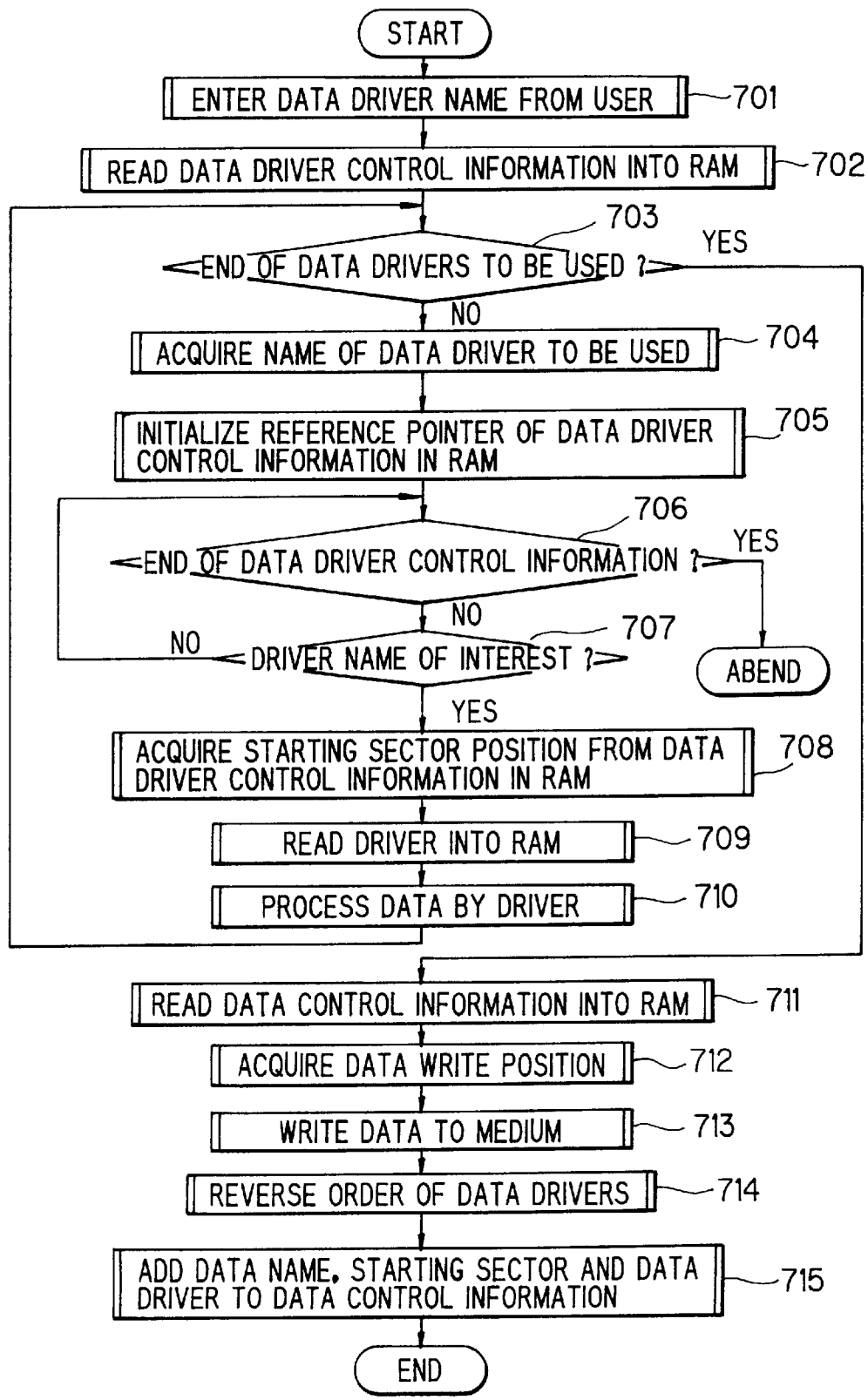
FIG. 32 is a flowchart (for writing) of processing according to the sixth embodiment.

FIG. 32 is a flowchart of processing for writing a data file in accordance with a sixth embodiment.

At the start of data-file write, the user enters a data driver name or information specifying a data driver corresponding thereto (step 701). For example, by issuing an instruction "Set Data Driver=Driver 1, 5, 6, 8" from an input device such as the keyboard, the data driver can be clearly specified. The CPU 3a then reads the data driver control information 40 into the RAM 3c (step 702). Next, the CPU 3a successively determines whether all data drivers that have been designated by the user exist in the data driver control information 40 (steps 703~707). If a data driver does not exist, processing is ended (abnormal end: abend).

If the data driver exists, then the CPU 3a acquires the recording starting position of the data driver from the data driver control information 40, reads it in the RAM 3c and subjects the data to predetermined processing using this data driver (steps 708~710).

The CPU 3a thenceforth executes processing from step 703 onward and subjects the data file to predetermined processing using all of the data drivers that have been designated by the user.

Thereafter, the CPU 3a reads in the user data control information 30 from the interchangeable storage medium 1 (step 711), acquires a position at which the data file is to be recorded and writes the processed data file at this recording position (steps 712, 713)). The CPU 3a then reverses the order of the group of data drivers specified by the user so that the order becomes that which prevails at the time of the reading operation (step 714). The CPU 3a thenceforth produces data control information indicating the corresponding relationship among the file name of the data, the names of the group of data drivers and the position at which the data file is written and writes this information to the interchangeable storage medium (step 715).

(d) Application of sixth embodiment

In accordance with the sixth embodiment, it is so arranged that a data file can be processed by a plurality of data drivers.

FIGS. 33A, 33B are diagrams for describing an application of the sixth embodiment. Numeral 30 and 40 denotes the user data control information and data driver control information, respectively. Here it is assumed that data driver 1 converts the character codes of text data, as illustrated in the first application of the second embodiment, data driver 2 compresses data, as indicated by the third application of the second embodiment, and data driver 3 specifies the conditions under which data are utilized, as indicated in the third embodiment.

In accordance with this example of application, data compression can be applied not only to Data B, which is to be subjected solely to data compression, but also to data that is to undergo data conversion, as in the case of Data A, and to data that is to undergo processing for specifying the utilization of data, as in the case of Data C. This makes it possible to utilize the capacity of the storage medium to the maximum extent.

In the example described above, data compression is applied jointly to each data file. However, the invention is not limited to this arrangement. In addition, this embodiment may be used in combination with the method of using device drivers selectively depending upon the operating system, as in the second embodiment.

Thus, the present invention is such that when a data file that has been stored on an interchangeable storage medium is to be used, the user need not separately register software conforming to data format or method of keeping the data in storage in a computer system. This makes it possible to improve operating performance.

In accordance with the present invention, a data file that has been stored on an interchangeable storage medium can be used jointly by computer systems having different operating systems. Accordingly, a data exchange can easily be performed between computer systems having different architectures or between different operating systems.

In accordance with the invention, even if a data file is recorded on an interchangeable storage medium in a novel or special format, the data file can be utilized without modifying the computer system or operating system.

In accordance with the invention, a computer system (operating system) or user capable of utilizing a data file that has been stored on an interchangeable storage medium can be limited with ease, and conditions under which read/write may take place can be set with facility.

In accordance with the invention, a desired data file can be read by entering a retrieval keyword.

In accordance with the invention, a data file can be written/read in units of a data size and in a data layout suited to the data file. This makes it possible to improve performance and space efficiency.

As many apparently widely different embodiments of the present invention can be made without departing from the spirit and scope thereof, it is to be understood that the invention is not limited to the specific embodiments thereof except as defined in the appended claims.

What is claimed is:

1. An interchangeable storage medium used for input/output of data in a computer system, comprising the following recorded on said medium:

a data file specified by a file name;

at least one program for processing the data file to match a format of the data file to a format which is utilizable by the computer system;

data control information indicating, for each data file, a corresponding relationship among a file name of the data file, a program name of the at least one program for applying said processing to the data file specified by the file name, and the location of the data file; and program control information indicating a corresponding relationship between the program name and a program location.

2. The storage medium according to claim 1, wherein said program control information includes, in addition to the corresponding relationship between the program name and the program location, information specifying an operating system in which said program is capable of being used.

3. The storage medium according to claim 2, wherein a plurality of items of program control information for different operating systems are recorded on said interchangeable storage medium in association with a single program name.

4. The storage medium according to claim 1, wherein said program control information includes, in addition to the corresponding relationship between the program name and the program location, information specifying an operating system in which the program is capable of being used, and information specifying whether a data file is capable of being read/written by said operating system, or specifying read- and write-enable conditions.

5. The storage medium according to claim 1, wherein said data control information includes, in addition to the corresponding relationship among the file name, the program name and the location of the data file, a retrieval keyword used to retrieve a data file.

6. The storage medium according to claim 5, wherein a retrieval program for retrieving a data file having an entered retrieval keyword is recorded on said interchangeable storage medium.

7. The storage medium according to claim 1, wherein when a data file is recorded in units of predetermined data sizes, said data control information includes, in addition to a corresponding relationship among a file name, a program name and the location of the data file, data layout information indicating data positions at which data in units of respective data sizes are recorded.

8. A method of reading data in a computer system in which a prescribed data file is read from an interchangeable storage medium, comprising the steps of:

providing an interchangeable storage medium on which the following are recorded: (1) a data file specified by a file name, (2) a program for processing the data file to match a format of the data file to a format which is utilizable by the computer system, (3) data control information indicating, for each data file, a corresponding relationship among a file name of the data file, a program name of the at least one program for applying said processing to the data file specified by the file name, and the location of the data file, and (4) program control information indicating a corresponding relationship between the program name and a program location;

when a read command has been issued, obtaining a data file location and the name of the program for subjecting this data file to predetermined processing from the data control information based upon a file name specified by the read command, and obtaining program location information of the program having the program name from the program control information;

reading the data file from the interchangeable storage medium based upon data file location information and reading the program from the interchangeable storage medium based upon the program location information; and subjecting the data file that has been read to predetermined processing by said program to convert the data file to data that the computer system is capable of utilizing.

9. A method of writing data in a computer system in which a data file is written to an intechangeable storage medium, comprising the steps of:

providing an interchangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying said processing to the data file specified by the file name, and the location of the data file, and (4) program control information indicating a corresponding relationship between the program name and a program location;

when a data file write command has been issued, obtaining program location information of the program having the program name specified by the write command from the program control information;

reading the program from the interchangeable storage medium based upon the program location information;

subjecting the data file to predetermined processing by said program and then writing the data file to the interchangeable storage medium; and producing data control information indicating the corresponding relationship among the file name of said data file, the program name of said program and a position at which the data file is written, and writing this data control information to the interchangeable storage medium.

10. A method of reading data in a computer system in which a prescribed data file is read from an interchangeable storage medium, comprising the steps of:

providing an interchangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying said processing to the data file specified by the file name, and the location of the data file, and (4) program control information indicating a corresponding relationship among the program name, a program location and information specifying an operating system in which said program is capable of being used;

recording the data file on the interchangeable storage medium in a predetermined format that is independent of the operating system;

when a read command has been issued, obtaining data file location information and the name of a program for subjecting this data file to predetermined processing from the data control information based upon a file name specified by the read command, and obtaining location of the program which has the program name and which is capable of being used by the operating system of the computer system from the program control information;

reading the data file from the interchangeable storage medium based upon the data file location information obtained and reading the program from the interchangeable storage medium based upon the program location information obtained; and subjecting the data file that has been read to predetermined processing by said program to convert the data file to the format that matches the format utilizable by the computer system.

11. A method of writing data in a computer system in which a data file is written to an interchangeable storage medium, comprising the steps of:

provulating an interchangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying said processing to the data file specified by the file name, and the location of the data file, and (4) program control information indicating a corresponding relationship among the program name, a program location and information specifying an operating system in which said program is capable of being used;

when a data file write command has been issued, obtaining the location of the program which has the program name specified by the write command and which is capable of being used by the operating system of the computer system from the program control information;

reading the program from the interchangeable storage medium based upon the program location information; and subjecting the data file to predetermined processing by said program to convert the data file to data having a format that is independent of the operating system, and writing the data to the interchangeable storage medium; and producing data control information indicating the corresponding relationship among the file name of said data file, the program name of said program and location of the data file, and writing this data control information to the interchangeable storage medium.

12. A method of reading data in a computer system in which a prescribed data file is read from an interchangeable storage medium, comprising the steps of:

providing an interchangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying predetermined processing to the data file specified by the file name, and the location of the data file, and (4) program control information indicating a corresponding relationship among the program name, a program location, information specifying an operating system in which said program is capable of being used, and an access condition for accessing the data file;

recording the data file on the interchangeable storage medium in a predetermined format that is independent of the operating system;

when a read command has been issued, obtaining a data file location and the name of the program for subjecting this data file to predetermined processing from the data control information based upon a file name specified by the read command, and obtaining the location of the program which is specified by the program name and which is capable of being used by the operating system of the computer system, as well as the access condition, from the program control information;

determining whether a read access condition has been satisfied;

if the read access condition has been satisfied, reading the data file from the interchangeable storage medium based upon the data file location information obtained, reading the program from the interchangeable storage medium based upon the program location information obtained, and subjecting the data file that has been read to predetermined processing by said program to convert the data file to data that the computer system is capable of utilizing; and if the read access condition has not been satisfied, disabling reading of the data file.

13. A method of writing data in a computer system in which a data file is written to an interchangeable storage medium, comprising the steps of:

providing an intechangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying predetermined processing to the data file specified by the file name, and the location of the data file, and (4) program control information indicating a corresponding relationship among the program name, a program location, information specifying an operating system in which said program is capable of being used, and an access condition for accessing the data file;

when a data file write command has been issued, obtaining the location of the program which has the program name specified by the write command and which is capable of being used by the operating system of the computer system, as well as the access condition, from the program control information;

determining whether a write access condition has been satisfied;

if the write access condition has been satisfied, reading the program from the interchangeable storage medium based upon the program location information;

subjecting the data file to predetermined processing by said program to convert the data file to data having a format that is independent of the operating system, and writing the data to the interchangeable storage medium;

producing data control information indicating the corresponding relationship among the file name of said data file, the program name of said program and write location of the data file, and writing this data control information to the interchangeable storage medium; and if the write access condition has not been satisfied, disabling writing of the data file.

14. A method of reading data in a computer system in which a prescribed data file is read from an interchangeable storage medium, comprising the steps of:

providing an interchangeable storage medium on which the following are recorded: (1) a data file specified by a file name, (2) a program for determining an access condition of the data file, (3) data control information indicating, for each data file, a corresponding relationship among the file name of the data file, the name of the program for determining the access condition of said data file and the location of the data file, and (4)

program control information indicating, for each program, a corresponding relationship among a program name, program location and information specifying an operating system in which said program is capable of being used;

when a read command has been issued, obtaining a data file location and the name of a program from the data control information based upon a file name specified by the read command, and obtaining location information of the program which is specified by the program name and which is capable of being used by the operating system of the computer system from the program control information;

reading a program from the interchangeable storage medium based upon the program location obtained, executing this program and determining whether a read access condition has been satisfied;

if the read access condition has been satisfied, reading the data file from the interchangeable storage medium based upon the data file location information obtained; and if the read access condition has not been satisfied, disabling reading of the data file.

15. A method of writing a data file to an interchangeable storage medium data in a computer system, comprising the steps of:

providing an interchangeable storage medium on which the following are recorded: (1) a data file specified by a file name, (2) a program for determining an access condition of the data file, (3) data control information indicating, for each data file, a corresponding relationship among the file name of the data file, the name of the program for determining the access condition of said data file and the location of the data file, and (4) program control information indicating, for each program, a corresponding relationship among the program name, program location and information specifying an operating system in which said program is capable of being used;

when a data file write command has been issued, obtaining the location of a program which has a program name specified by the write command and which is capable of being used by the operating system of the computer system from the program control information;

reading the program from the interchangeable storage medium based upon the program location information obtained, executing this program and determining whether a write access condition has been satisfied;

if the write access condition has been satisfied, writing the data file to the interchangeable storage medium, producing data control information indicating the corresponding relationship among the file name of said data file, the program name of said program and write location of the data file, and writing this data control information to the interchangeable storage medium; and if the write access condition has not been satisfied, disabling writing of the data file.

16. A method of reading data in a computer system in which a prescribed data file is read from an interchangeable storage medium, comprising the steps of:

providing an interchangeable storage medium on which the following are recorded: (1) a data file specified by the file name, (2) at least one program for processing the data file to match a format of the data file to a format which is utilizable by the computer system, (3) data control information indicating, for each data file, a corresponding relationship among a file name of the data file, a program name of the at least one program for applying said processing to the data file specified by the file name, the location of the data file and a retrieval keyword used to retrieve the data file, and (4) program control information indicating a corresponding relationship among the program name, a program location and information specifying an operating system in which said program is capable of being used;

recording the data file on the interchangeable storage medium in a predetermined format that is independent of the operating system;

when a read command has been issued, obtaining data control information having a retrieval keyword specified by the read command;

obtaining data file location information and the name of the program for processing the data file from said data control information, and obtaining location information of the program which is specified by the program name and which is capable of being used by the operating system of the computer system from the program control information;

reading the data file from the interchangeable storage medium based upon the data file location information obtained and reading the program from the interchangeable storage medium based upon the program location information obtained; and subjecting the data file that has been read from said program to predetermined processing by said program for processing the data file to a format which is utilizable by the computer system.

17. A method of writing data in a computer system in which a data file is written to an interchangeable storage medium, comprising the steps of:

providing an interchangeable storage medium on which the following are recorded: (1) a data file specified by a file name, (2) at least one program for processing the data file to match a format of the data file to a format which is utilizable by the computer system, (3) data control information indicating, for each data file, a corresponding relationship among a file name of the data file, a program name of the at least one program for applying said processing to a data file specified by the file name, the location of the data file and a retrieval keyword used to retrieve the data file, and (4) program control information indicating a corresponding relationship among a program name, a program location and information specifying an operating system in which said program is capable of being used;

when a data file write command has been issued, obtaining the location of the program which has the program name specified by the write command and which is capable of being used by the operating system of the computer system from the program control information;

reading the program from the interchangeable storage medium based upon the program location information, subjecting the data file to predetermined processing by said program and then writing the data file to the interchangeable storage medium; and subsequently creating a retrieval keyword of said data file, producing data control information indicating a corresponding relationship among a file name, a program name, data file location and retrieval keyword, and writing this data control information to the interchangeable storage medium.

18. A method of reading data in a computer system in which a prescribed data file is read from an interchangeable storage medium, comprising the steps of:

providing an interchangeable storage medium on which the following are recorded: (1) a data file specified by a file name, (2) a program which, in a case where a data file is recorded in units of predetermined data sizes, determining the data size units and data layout, (3) data control information indicating, for each data file, a corresponding relationship among a file name of the data file, a program name of a program for deciding said data size units and data layout of the data file specified by the file name, starting position of the data file and data layout information indicating data positions at which data in units of respective data sizes are recorded, and (4) program control information indicating a corresponding relationship between the program name and program location;

when a read command has been issued, obtaining starting position of a data file, data layout information and name of the program from the data control information based upon the file name specified by the read command, and obtaining location of the program having the program name from the program control information;

reading the program from the interchangeable storage medium based upon the program location information and reading the data file from the interchangeable storage medium in accordance with said program based upon the obtained data file starting position and data layout information thereby placing the data file in a format which matches a format which is utilizable by the computer system.

19. A method of writing data in a computer system in which a data file is written to an interchangeable storage medium, comprising the steps of:

providing an interchangeable storage medium on which the following are recorded: (1) a data file specified by a file name, (2) a program which, in a case where a data file is recorded in units of a predetermined data sizes, determines the data size units and data layout, (3) data control information indicating, for each data file, a corresponding relationship among a file name of the data file, a program name of a program for deciding said data size units and data layout of the data file specified by the file name, starting position of the data file and data layout information indicating data positions at which data in units of respective data sizes are recorded, and (4) program control information indicating a corresponding relationship between the program name and program location;

when a data file write command has been issued, obtaining the location of the program having the program name specified by the write command from the program control information, and reading the program from the interchangeable storage medium based upon location information of the program;

in a case where a data file is written to the interchangeable storage medium in units of predetermined data sizes, deciding said data size units and data layout by said program and writing the data file to the interchangeable storage medium;

subsequently producing data control information indicating a corresponding relationship among the file name of said data file, the program name of said program, starting position of the data file and data layout information, and writing this data control information to the interchangeable storage medium.

20. A computer system for reading in a data file that has been stored on an interchangeable storage medium, executing predetermined processing and writing a created data file to an interchangeable storage medium, comprising:

a drive unit for reading in a data file and program from an interchangeable storage medium and writing a data file to an interchangeable storage medium; and a processing unit which, at writing of a data file, writes, to an interchangeable storage medium in a form correlated with the data file, a program for processing the data file to match a format of the data file to a format which is utilizable by the computer system, and at reading of a data file, subjects the data file to said processing, by a program corresponding to said data file.

21. A computer system for reading in a data file that has been stored on an interchangeable storage medium, executing processing and writing a created data file to an interchangeable storage medium, comprising:

a drive unit for reading in a data file and program from an interchangeable storage medium and writing a data file to an interchangeable storage medium; and a processing unit which, at writing of a data file, writes, to an interchangeable storage medium in a form correlated with said data file, a program for processing the data file to match a format of the data file to a format which is utilizable by the computer system, and information specifying an operating system in which said program is capable of being executed, and at reading of a data file, subjects said data file to said processing, by a program which corresponds to said data file and which is capable of being executed by the computer system.

* * * * *